(12) United States Patent
Yorita

(10) Patent No.: US 6,184,759 B1
(45) Date of Patent: *Feb. 6, 2001

(54) DIELECTRIC FILTER HAVING INDUCTIVE COUPLING WINDOWS BETWEEN RESONATORS, AND TRANSCEIVER USING THE DIELECTRIC FILTER

(75) Inventor: Tadahiro Yorita, Nagaokakyo (JP)

(73) Assignee: Murata Manufacturing Co., Ltd. (JP)

( * ) Notice: Under 35 U.S.C. 154(b), the term of this patent shall be extended for 0 days.

This patent is subject to a terminal disclaimer.

(21) Appl. No.: 09/504,759

(22) Filed: Feb. 14, 2000

Related U.S. Application Data

(62) Division of application No. 08/838,807, filed on Apr. 10, 1997, now Pat. No. 6,026,281, which is a continuation of application No. 08/443,427, filed on May 18, 1995, now abandoned, which is a division of application No. 08/426,287, filed on Apr. 21, 1995, now Pat. No. 6,122,489, which is a continuation of application No. 08/089,223, filed on Jul. 8, 1993, now abandoned.

(30) Foreign Application Priority Data

Jul. 6, 1993 (JP) .................................................. 5-167044

(51) Int. Cl.⁷ ............................ H01P 1/202; H01P 1/213; H01P 7/04
(52) U.S. Cl. ........................... 333/134; 333/206; 333/222
(58) Field of Search .................................. 333/202, 206, 333/207, 222, 134, 202 DB

(56) References Cited

U.S. PATENT DOCUMENTS

| | | | |
|---|---|---|---|
| 4,179,673 | * 12/1979 | Nishikawa et al. | 333/202 X |
| 5,130,683 | * 7/1992 | Agahi-Kesheh et al. | 333/203 |
| 5,525,946 | * 6/1996 | Tsujiguchi et al. | 333/206 X |
| 5,557,246 | * 9/1996 | Ishihara et al. | 333/206 |
| 5,737,696 | * 4/1998 | Yorita | 455/83 |

FOREIGN PATENT DOCUMENTS

| | | | |
|---|---|---|---|
| 0208424 | * 1/1987 | (EP) | 333/206 |
| 64-000801 | * 1/1989 | (JP) | 333/206 |

(List continued on next page.)

Primary Examiner—Robert Pascal
Assistant Examiner—Barbara Summons
(74) Attorney, Agent, or Firm—Ostrolenk, Faber, Gerb & Soffen, LLP

(57) ABSTRACT

A dielectric filter includes a first dielectric block having a through bore, substantially all of the surface area of the first dielectric block being covered with a conductive film to define a first dielectric resonator whose magnetic energy varies in the direction of an axis of the through bore. A first coupling window is formed in the conductive film on a first side surface for coupling an input signal applied thereto to the first dielectric resonator. A second coupling window is formed on a second side surface in a location wherein the magnetic energy in the first dielectric block is relatively high so that magnetic energy exits the first dielectric block via the second coupling window. A second dielectric block has a through bore and substantially all of the surface area of the second dielectric block is covered with a conductive film to define a second dielectric resonator. A third coupling window is formed on a first side surface of the second dielectric block at a location corresponding to the second coupling window such that magnetic energy leaving the first dielectric block via the second coupling window enters the second dielectric block via the third coupling window and sets up a magnetic field in the second dielectric block whose magnetic energy varies in the direction of the through bore of the second dielectric block. A fourth coupling window is formed on a second surface of the second dielectric block at a location where the resonant magnetic energy in the second dielectric block is relatively high such that magnetic energy leaves the second dielectric block via the fourth coupling window.

3 Claims, 23 Drawing Sheets

FOREIGN PATENT DOCUMENTS

| | | | | |
|---|---|---|---|---|
| 1-053601 | * | 3/1989 | (JP) | 333/202 DB |
| 2-050502 | * | 2/1990 | (JP) | 333/202 DB |
| 3-136402 | * | 6/1991 | (JP) . | |
| 4-150101 | * | 5/1992 | (JP) | 333/222 |
| 4-167701 | * | 6/1992 | (JP) | 333/206 |

* cited by examiner

COUPLING ELECTRODE
SIZE:1.4×2.2mm²

COUPLING ELECTRODE
SIZE:1.4×1.6mm²

COUPLING ELECTRODE
SIZE:1.4×1.3mm²

DIELECTRIC FILTER HAVING INDUCTIVE COUPLING WINDOWS BETWEEN RESONATORS, AND TRANSCEIVER USING THE DIELECTRIC FILTER

RELATED APPLICATIONS

This application is a division of Ser. No. 08/838,807 filed Apr. 10, 1997, now U.S. Pat. No. 6,026,281, which is a continuation of Ser. No. 08/443,427 filed May 18, 1995, abandoned, which is a division of Ser. No. 08/426,287 filed Apr. 21, 1995, now U.S. Pat. No. 6,122,489, which is a continuation of Ser. No. 08/089,223, filed Jul. 8, 1993, abandoned, the disclosures of which are incorporated by reference herein.

This application is related to Ser. No. 08/443,926 filed May 18, 1995, now U.S. Pat. No. 5,737,696, the disclosures of which are incorporated by reference herein.

FIELD OF THE INVENTION

The present invention relates to a dielectric filter comprising a plurality of dielectric blocks and a transceiver using the dielectric filter.

PRIOR ART

In a conventional dielectric filter of the kind referred to above, there are provided a plurality of resonators in a hexahedral rectangular dielectric unit. All of the six surfaces of the filter are substantially coated with an electrode film, and therefore, the filter does not require a shielding case or a mounting bracket, that is, the filter is able to be mounted on the surface of a circuit board. In the conventional structure as described above, since a plurality of resonators are provided in one dielectric block, many different kinds of molds must be provided if filters having different numbers of resonators are desired. More specifically, as the dielectric filter of this type is generally formed of ceramic material, the dielectric filter is manufactured by placing a ceramic material powder in a mold and baking the mold. Therefore, a different mold must be prepared for each type of filter to be manufactured, thus raising manufacturing costs. Moreover, since the distance between the resonators is determined by the size and shape of each mold, the degree of coupling between the resonators is hard to set.

In another example of a conventional dielectric filter of a comb line type, the degree of coupling of the resonators and the frequency of each resonator are interrelated as a function of the structure of the filter. One is changed when the other is changed, and each affects the other, and therefore, it is difficult to adjust the resonant frequency and the degree of coupling independently of each other.

In a further example of a known dielectric filter, a single resonator is provided in a single dielectric block which is coupled with another dielectric block having a resonator. Since a separate element is used to couple the dielectric blocks in this example, the structure is complicated and the number of parts is increased. This complicates manufacturing procedures and increases manufacturing costs.

Yet another known dielectric filter is composed of a plurality of dielectric bodies, each of which is provided with a resonator and bonded together to form a unit. The resonator used is a quarter-wave resonator wherein one end face is short-circuited and the other end face is open-circuited. Electromagnetic energy leaks from the open end face, leading to undesirable coupling of resonators. It is very difficult to achieve a predetermined degree of coupling with this structure. Further, a shielding cover to prevent undesired coupling with an external circuit is required. There is also a limit to the degree the transceiver can be miniaturized when this type of filter is employed.

SUMMARY OF THE INVENTION

A central object of the present invention is to provide a novel dielectric filter which can be easily manufactured to be compact in size, and with a variable number of resonators, which does not require a bracket or a shielding case and which does not require different molds for each resonator. It is a further object of the present invention to reduce the number of components and reduce manufacturing costs. It is a further object of the present invention to provide a filter wherein the resonant frequency of each resonator and the degree of coupling between resonators can be independently set or adjusted as desired.

A dielectric filter includes a first dielectric block having a through bore, substantially all of the surface area of the first dielectric block being covered with a conductive film to define a first dielectric resonator whose magnetic energy varies in the direction of an axis of the through bore. A first coupling window is formed in the conductive film on a first side surface for coupling an input signal applied thereto to the first dielectric resonator. A second coupling window is formed on a second side surface in a location wherein the magnetic energy in the first dielectric block is relatively high so that magnetic energy exits the first dielectric block via the second coupling window. A second dielectric block has a through bore and substantially all of the surface area of the second dielectric block is covered with a conductive film to define a second dielectric resonator. A third coupling window is formed on a first side surface of the second dielectric block at a location corresponding to the second coupling window such that magnetic energy leaving the first dielectric block via the second coupling window enters the second dielectric block via the third coupling window and sets up a magnetic field in the second dielectric block whose magnetic energy varies in the direction of the through bore of the second dielectric block. A fourth coupling window is formed on a second surface of the second dielectric block at a location where the resonant magnetic energy in the second dielectric block is relatively high such that magnetic energy leaves the second dielectric block via the fourth coupling window.

A transceiver according to the present invention can be miniaturized by using the dielectric filter of the present invention mentioned above.

DETAILED DESCRIPTION OF EMBODIMENTS OF THE INVENTION

Figure 1:
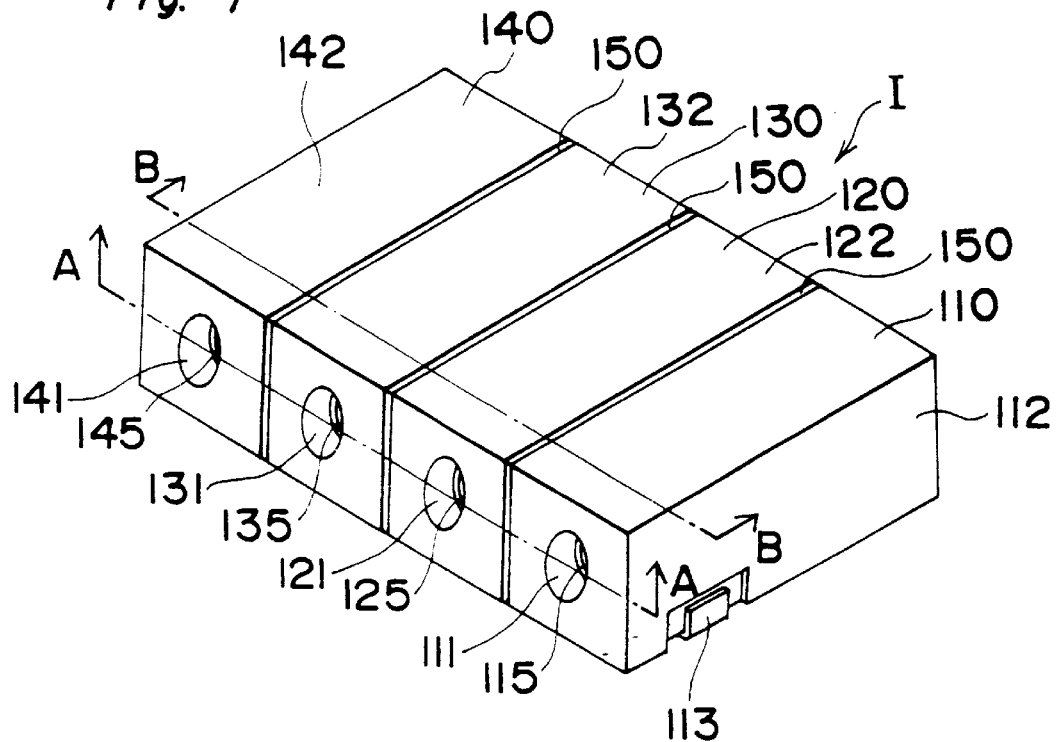
FIG. 1 is a perspective view of a filter I according to a first embodiment of the present invention.

Several embodiments of the invention will be described, in which like reference numerals indicate like elements and parts, and each element and part is described in connection with at least one drawing in which it appears.

First Embodiment

A first embodiment of the present invention will be depicted with reference to FIGS. 1 through 7.

A filter I shown in FIG. 1 is a unit consisting of first, second, third and fourth dielectric blocks 110, 120, 130 and 140, respectively, as an example of a capacitive coupling type resonator having one end short-circuited and the vicinity of the other end open-circuited and which resonates at a length $\lambda/4$, where $\lambda$ is the resonant wavelength.

Figure 2:
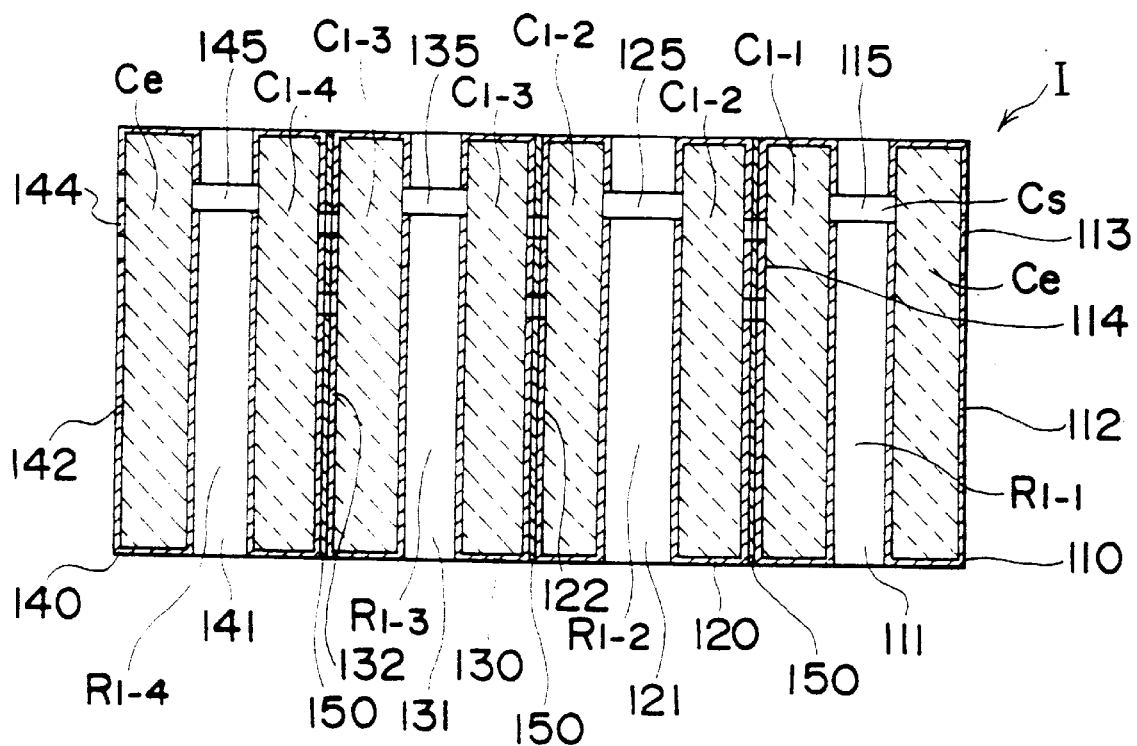
FIG. 2 is a cross sectional view taken along the line A—A of FIG. 1.
Figure 3:
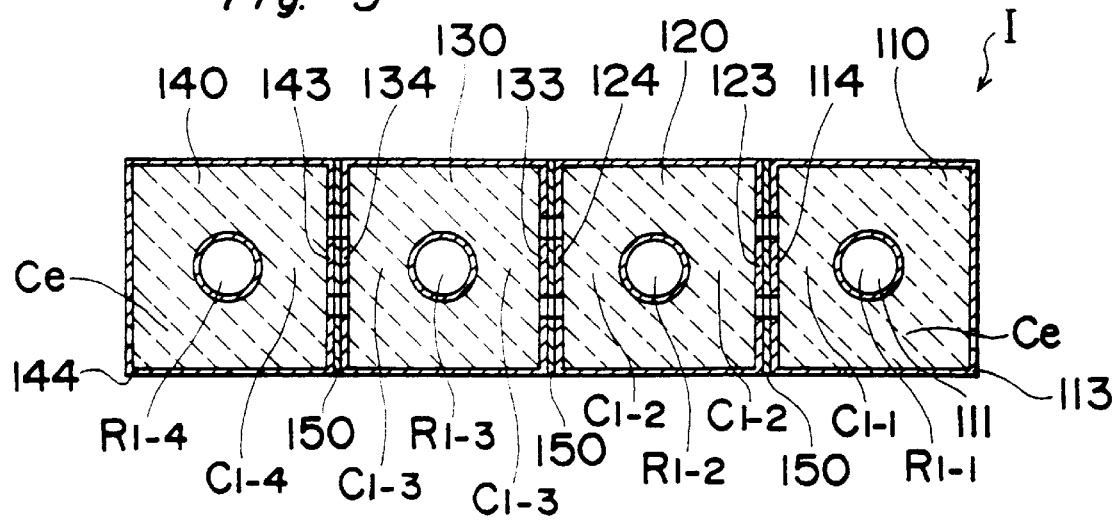
FIG. 3 is a cross sectional view taken along the line B—B of FIG. 1.
Figure 4:
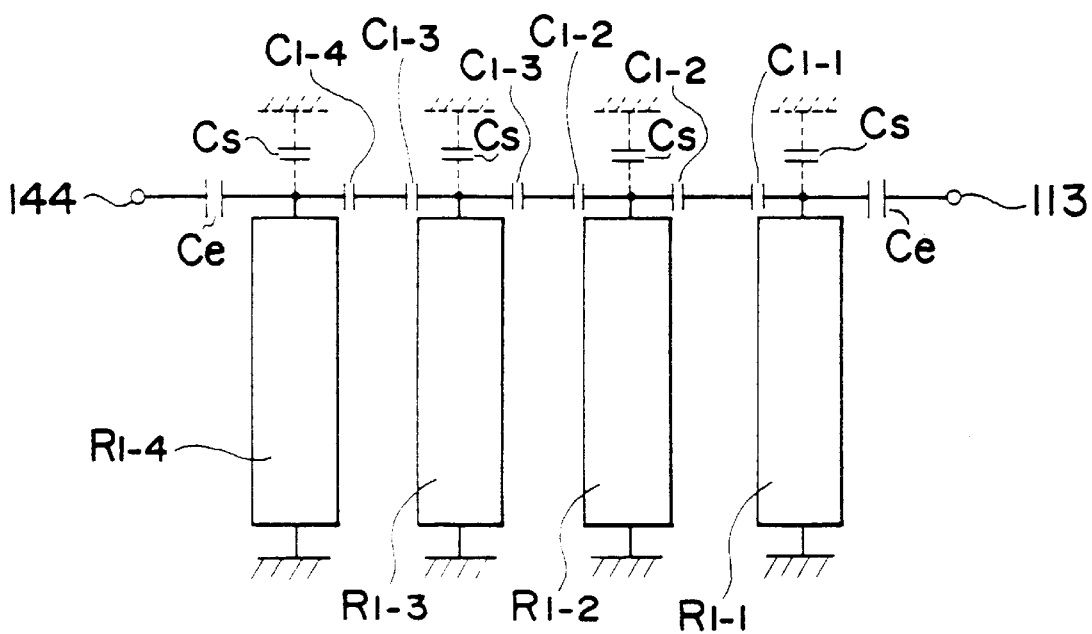
FIG. 4 is an equivalent circuit diagram of the filter I of FIG. 1.
Figure 5:
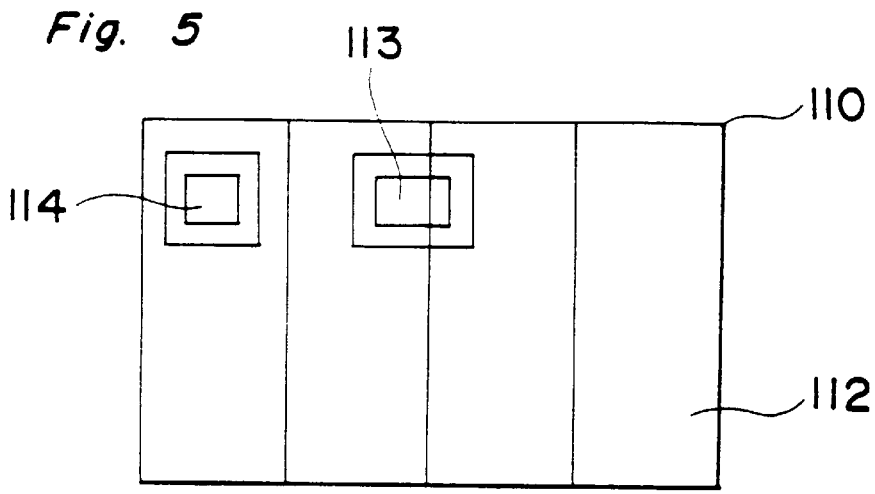
FIG. 5 is a development diagram of four side surfaces of a first dielectric block 110 in FIG. 1.
Figure 6:
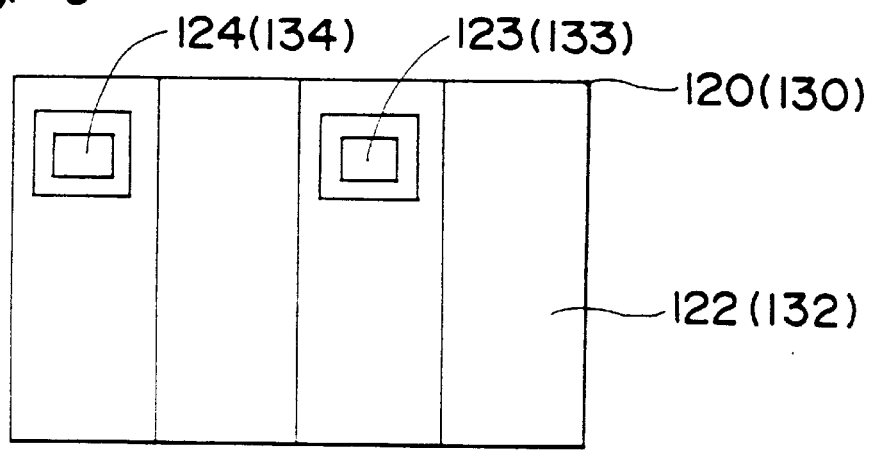
FIG. 6 is a development diagram of four side surfaces of a second (and third) dielectric block 120 (130) in FIG. 1.
Figure 7:
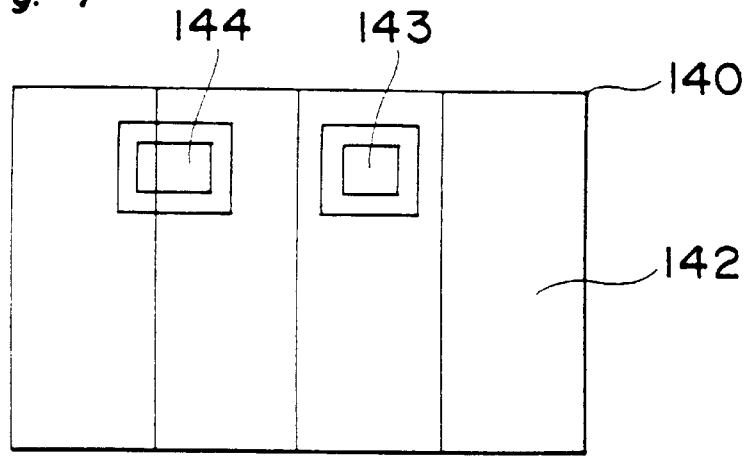
FIG. 7 is a development diagram of four side surfaces of a fourth dielectric block 140 in FIG. 1.
Figure 8:
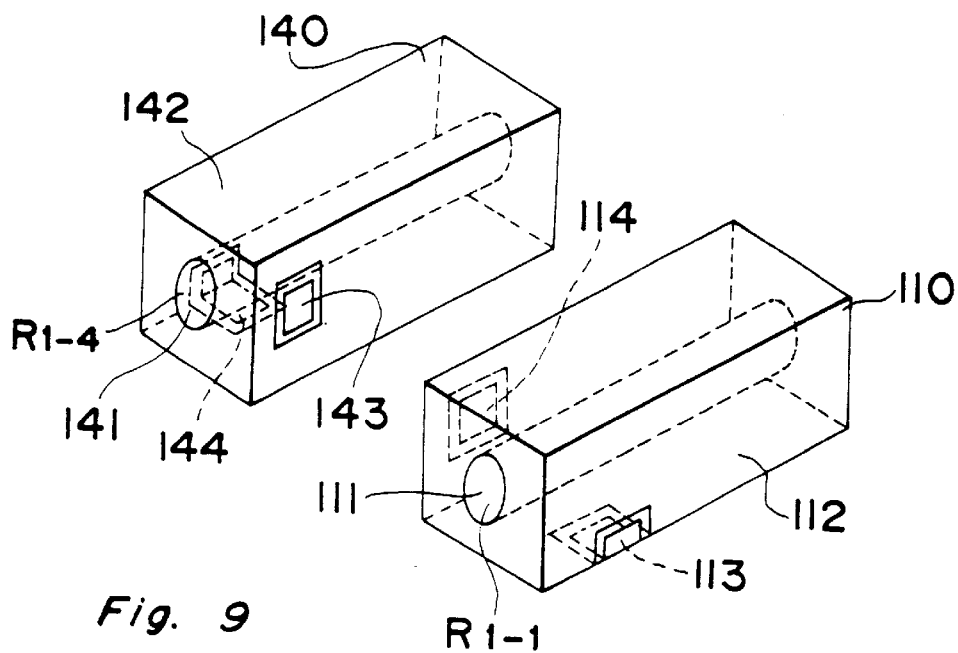
FIG. 8 shows a modified filter constructed by coupling the first and fourth dielectric blocks 110, 140 of FIG. 1.
Figure 9:
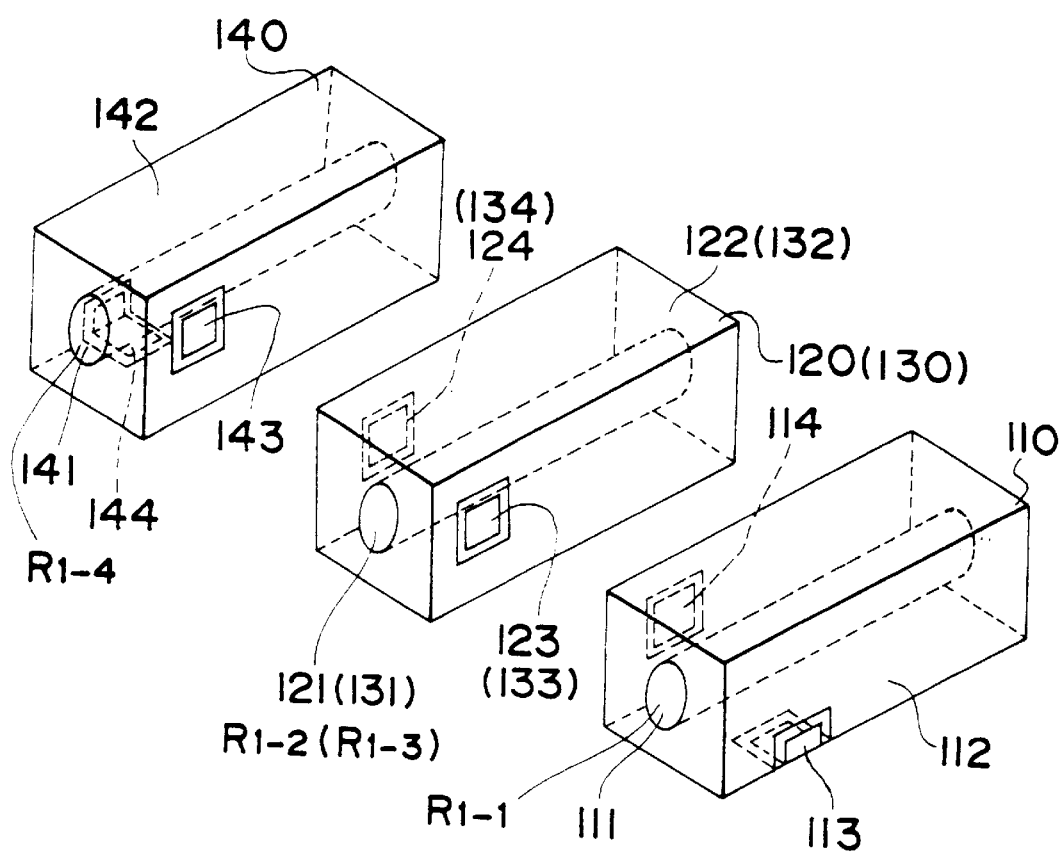
FIG. 9 shows a modified filter constructed by coupling the first, second (third) and fourth dielectric blocks 110, 120 (130), 140 of FIG. 1.

FIGS. 2 and 3 are cross sectional views taken along the lines A—A and B—B of FIG. 1, respectively, and FIG. 4 is an equivalent circuit diagram of the filter I. FIG. 5 is a development diagram of the four side surfaces of the first dielectric block 110 of FIG. 1. FIGS. 6 and 7 are similar development diagrams of the four side surfaces of the second (and third) and fourth dielectric blocks 120 (130) and 140 of FIG. 1. FIG. 8 illustrates a modified filter obtained by coupling the first and fourth dielectric blocks 110, 140. The filter of FIG. 9 is a further modification resulting from coupling of the first, second (third) and fourth dielectric blocks 110, 120 (130) and 140.

The first dielectric block 110 is formed of a dielectric material such as a ceramic dielectric or the like in the configuration of a generally rectangular parallelepiped, having a top surface, a bottom surface, a front side surface, a rear side surface, a left side surface and a right side surface. An opening 111 is bored through the central part of the first dielectric block 110, which extends between the front side and rear side surfaces of the block thereby to define a first resonator R1-1.

A conductive thin film 112 is coated completely over the six outer surfaces of the block 110 and the inner surface of the opening 111 of the first dielectric block 110 except for some portions to be described later by a known electrode film forming technique using a conductive material, e.g., silver or copper. The conductive coating 112 at four of the six surfaces of the dielectric block 110, namely, the top surface, bottom surface, right side surface and left side surface is formed as shown in the development diagram of FIG. 5. As is clear from FIG. 5, an exposed rectangular part where the conductive film is not coated thereby to expose the dielectric block is provided bridging the right side surface and the bottom surface of the dielectric block in an area where the electric field assumes its predominant energy component. An island in the exposed part, having the conductive film coated thereon, is used as a first input coupling electrode 113. Similarly, a rectangular exposed part (i.e., a part without the conductive film coated thereon, where the dielectric block is exposed) is formed at the left side surface of the dielectric block, more specifically, in an area where the energy component of the electric field is predominant, and an island in the exposed part where the conductive film is coated is used as a first output coupling electrode 114. Moreover, as indicated in FIG. 2, an exposed part 115 where the dielectric block is exposed is provided in the inner surface of the opening 111 at a location therein closer to the front surface of the block, where the exposed part 115 has a ring shape of small width and is not coated with the conductive film.

In the first dielectric block 110 constructed in the above-described manner, as represented in the equivalent circuit diagram of FIG. 4, the resonator R1-1 is defined by the opening 111 of the dielectric block. An external coupling capacitance Ce is formed between the inner surface of the opening 111 and the right side surface and the bottom surface of the block 110, while an internal coupling capacitance C1-1 is formed between the inner surface of the opening 111 and the left side surface of the block. That is, the first dielectric block 110 has the first input coupling electrode 113 as an input terminal of the filter I bridging the right side surface and bottom surface thereof to couple an input signal with the resonator R1-1, and the first output coupling electrode 114 at the left side surface of the dielectric body. Further, a stray capacitance Cs is formed at the ring-shaped exposed part 115 of the inner surface of the opening 111 wherein the dielectric block is exposed.

The second dielectric block 120 is formed of a dielectric material such as a ceramic dielectric or the like, having approximately the same size as the first dielectric block 110 in a generally rectangular parallelepiped shape with a top surface, a bottom surface, a front side surface, a rear side surface, a left side surface and a right side surface. The second dielectric block 120 also has an opening 121 which extends between the front and rear side surfaces thereof. The opening 121 penetrates the central part of the block, constituting a second resonator R1-2.

The second dielectric block 120 is coated with a conductive thin film 122 over all of the six outer surfaces of the block 120 and the inner surface of the opening 121 except for some portions to be described later, according to a well-known electrode film forming method using a conductive material, for example, silver or copper. The conductive coating 122 at the top, bottom, right side and left side surfaces of the second dielectric block 120 is formed as shown in the development diagram of FIG. 6. More specifically, as is readily understood from FIG. 6, a rectangular part where the dielectric block is exposed is provided at the right side surface of the block where the energy component of the electric field is stronger, and the conductive film is not coated over the exposed part. An island within the exposed part where the conductive coating is formed is used as a second input coupling electrode 123. Meanwhile, another rectangular exposed part not coated with the conductive film is provided at the left side surface of the dielectric block where the electric field has a superior energy component, and an island in the exposed part where the conductive film is coated becomes a second output coupling electrode 124. At the same time, as shown in FIG. 2, an exposed part 125 where the dielectric block is exposed, without the conductive film, is provided in the inner surface of the opening 121 at the side closer to the front surface of the block. The exposed part 125 is ring-shaped and small in width.

As represented in the equivalent circuit diagram of FIG. 4, the opening 121 of the second dielectric block 120 constitutes the resonator R1-2, and internal coupling capacitances C1-2 are defined respectively between the inner surface of the opening 121 and the right side surface, and between the inner surface of the opening 121 and the left side surface of the block. In other words, the second input coupling electrode 123 is formed at the right side surface of the dielectric block so as to couple an input signal to the resonator R1-2, and the second output coupling electrode 124 is formed at the left side surface of the block. A stray capacitance Cs is formed at the ring-shaped exposed part 125 in the inner surface of the opening 121.

The third dielectric block 130 is made of a dielectric material such as a ceramic dielectric, and is generally formed in the configuration of a rectangular parallelepiped, with approximately the same size as the first dielectric block 110. The third dielectric block 130 has six surfaces, namely, a top surface, a bottom surface, a front side surface, a rear side surface, a left side surface and a right side surface, and is constructed in a structure similar to that of the second dielectric block 120. An opening 131 is formed in the third dielectric block 130, passing through the central part of the block, between the front and rear side surfaces of the block, and defines a third resonator R1-3.

The third dielectric block 130 is coated with a conductive thin film 132 on the six outer surfaces and on the inner surface of the opening 131 except for some portions to be described later according to a known electrode film forming method with the use of silver or copper, etc. As shown in FIG. 6, a third input coupling electrode 133 is formed by an island formed of the conductive film in an exposed part at the right side surface of the dielectric block where the electric field assumes a superior energy component. Moreover, a third output coupling electrode 134 is formed by an island where the conductive film is coated in an exposed part at the left side surface of the dielectric block, namely, where the energy component of the electric field is strong. Moreover, as indicated in FIG. 2, a ring-shaped exposed part 135 of small width where the dielectric block is exposed is provided in the inner surface of the opening 131 at the side thereof closer to the front side surface of the block.

As represented in the equivalent circuit diagram of FIG. 4, in the third dielectric block 130 of the above-described structure, the resonator R1-3 is defined by the opening 131 of the dielectric body, while internal coupling capacitances C1-3 are secured between the inner surface of the opening 131 and the right side surface of the block, and the inner surface of the opening 131 and the left side surface of the block. That is, the second input coupling electrode 133 is formed at the right side surface of the dielectric block so as to couple an input signal with the resonator R1-3, and the third output coupling electrode 134 is formed at the left side surface of the dielectric block. A stray capacitance Cs is defined at the exposed part 135 of the inner surface of the opening 131.

The fourth dielectric block 140 is made of a dielectric material, e.g., a ceramic dielectric or the like, which is a generally rectangular parallelepiped and is approximately the same in size as the first dielectric block 110, having a top surface, a bottom surface, a front side surface, a rear side surface, a left side surface and a right side surface. Moreover, an opening 141 is bored through the central part of the block and has openings at the front side and rear side surfaces of the block 140. The opening 141 constitutes a fourth resonator R1-4.

The fourth dielectric block 140 is coated with a thin conductive film 142 on the six outer surfaces and on the inner surface of the opening 141 except for some portions which will be depicted later, where the film is coated in a known electrode film forming manner using silver, copper or the like. The conductive film 142 at the top surface, bottom surface, right side surface and left side surface of the fourth dielectric block 140 is formed as shown in the development diagram of FIG. 7. As indicated in FIG. 7, a rectangular exposed part where the conductive film is not coated and therefore the dielectric block is exposed is provided at the right side surface of the dielectric block in an area where the energy component of the electric field is predominant, and a fourth input coupling electrode 143 is provided by an island coated with the conductive film in the exposed part. On the other hand, a fourth output coupling electrode 144 is formed by an island formed in a rectangular exposed part bridging the left side surface and the bottom surface of the dielectric block in an area displaying a more intense energy component of the electric field. Although the conductive film is not coated in the exposed part, the island is coated with the conductive film. As shown in FIG. 2, in the inner surface of the opening 141 is formed a narrow, ring-shaped exposed part 145 (i.e., a part where the dielectric block is exposed without the conductive film being coated thereon). The exposed part 145 is formed closer to the front surface of the block.

In the above-depicted structure of the fourth dielectric block 110, as represented in the equivalent circuit diagram of FIG. 4, the opening 141 of the dielectric block constitutes the resonator R1-4, while an internal coupling capacitance C1-4 is defined between the inner surface of the opening 141 and the right side surface of the block, and an external coupling capacitance Ce is formed between the inner surface of the opening 141 and the left side surface and the bottom surface. In other words, the fourth dielectric block 140 has the fourth input coupling electrode 143 at the right side surface thereof to couple an input signal with the resonator R1-4 and the fourth output coupling electrode 144 as an output terminal of the filter I at the left side surface and the bottom surface thereof. A stray capacitance Cs is formed at the ring-shaped exposed part 145 of the inner surface of the opening 141.

The above four dielectric blocks 110, 120, 130 and 140 are sequentially aligned in the lateral direction in such a manner that the left side surface of the first dielectric block 110 confronts the right side surface of the second dielectric block 120, the left side surface of the second dielectric block 120 confronts the right side surface of the third dielectric block 130, and the left side surface of the third dielectric block 130 faces the right side surface of the fourth dielectric block 140, and the dielectric blocks are bonded integrally via a conductive adhesive material. Thus, the unit as shown in FIG. 1 is obtained, namely, the filter I of a type having one end short-circuited and the vicinity of the other end open-circuited. The equivalent circuit of the filter I has, as shown in FIG. 4, the four resonators R1-1, R1-2, R1-3 and R1-4 connected via the internal coupling capacitances C1-1, C1-2, C1-3, and C1-4, with external coupling capacitances Ce at both ends thereof. Each stray capacitance Cs in the equivalent circuit diagram of FIG. 4 is small enough to be negligible.

More specifically, the part 112 coated with the conductive film at the left side surface of the first dielectric block 110, except for the portion where the dielectric block is exposed, is integrally bonded with the part 122 coated with the conductive film at the right side surface of the second dielectric block 120 adjacent to the first dielectric block 110, via a conductive bonding material 150, for example, a solder, a conductive adhesive containing silver powder, etc. Moreover, the first output coupling electrode 114 at the left side surface of the first dielectric block 110 is integrally bonded with the corresponding second input coupling electrode 123 at the right side surface of the second dielectric block 120 via the conductive material 150.

The part 122 coated with the conductive film at the left side surface of the second dielectric block 120 is integrally bonded with the part 132 coated with the conductive film of the right side surface of the adjacent third dielectric block 130 via the conductive bonding material, and further the second output coupling electrode 124 at the left side surface of the second dielectric block 120 is bonded integrally to the third input coupling electrode 133 at the right side surface of the third dielectric block 130 via the conductive adhesive material 150.

The part 132 coated with the conductive film at the left side surface of the third dielectric block 130 is integrally bonded to the part 142 coated with the conductive film at the light side surface of the fourth dielectric block 140, except for the exposed part, via the conductive adhesive material 150. Moreover, the first output coupling electrode 134 formed at the left side surface of the third dielectric block 130 is integrally bonded to the second input coupling electrode 143 formed corresponding to the electrode 134 at the right side surface of the fourth dielectric block 140, via the conductive adhesive material 150.

Second Embodiment

A second embodiment of the present invention will be discussed hereinbelow with reference to FIGS. 10 through 16.

Figure 10:
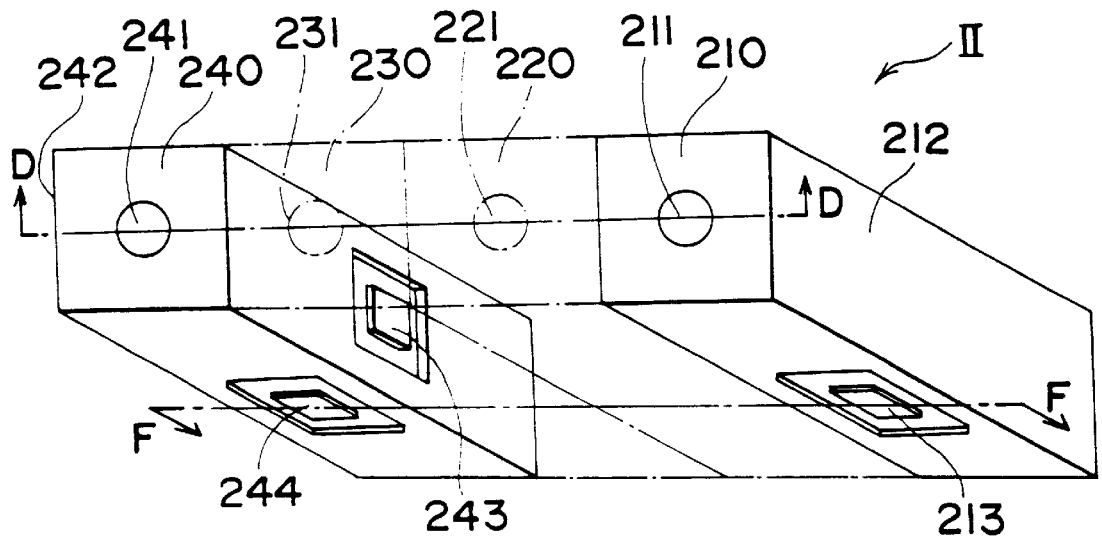
FIG. 10 is perspective view of a filter II according to a second embodiment of the present invention.

A filter II of FIG. 10 is constituted of first through fourth dielectric blocks 210, 220, 230 and 240, respectively, in a unit, which is an example of a capacitive coupling resonator with both ends short-circuited which resonates at a length $\lambda/2$, where $\lambda$ is the resonant wavelength. In FIG. 10, the first and fourth dielectric blocks 210 and 240 are shown by solid lines and the second and third dielectric blocks are shown by imaginary lines.

Figure 11:
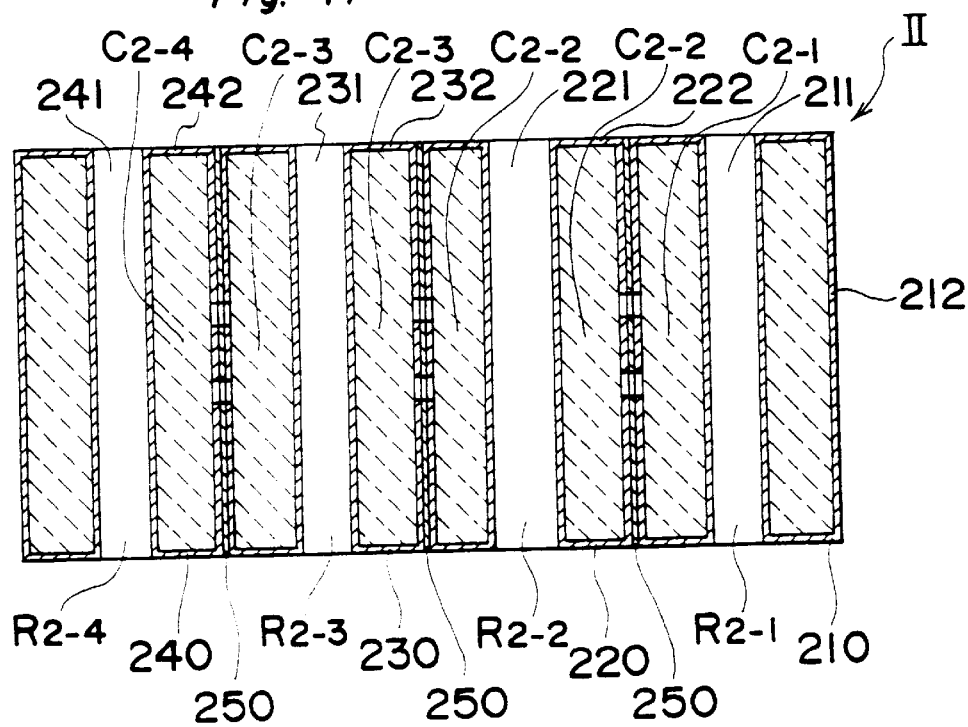
FIG. 11 is a cross sectional view taken along the line D—D of FIG. 10.
Figure 12:
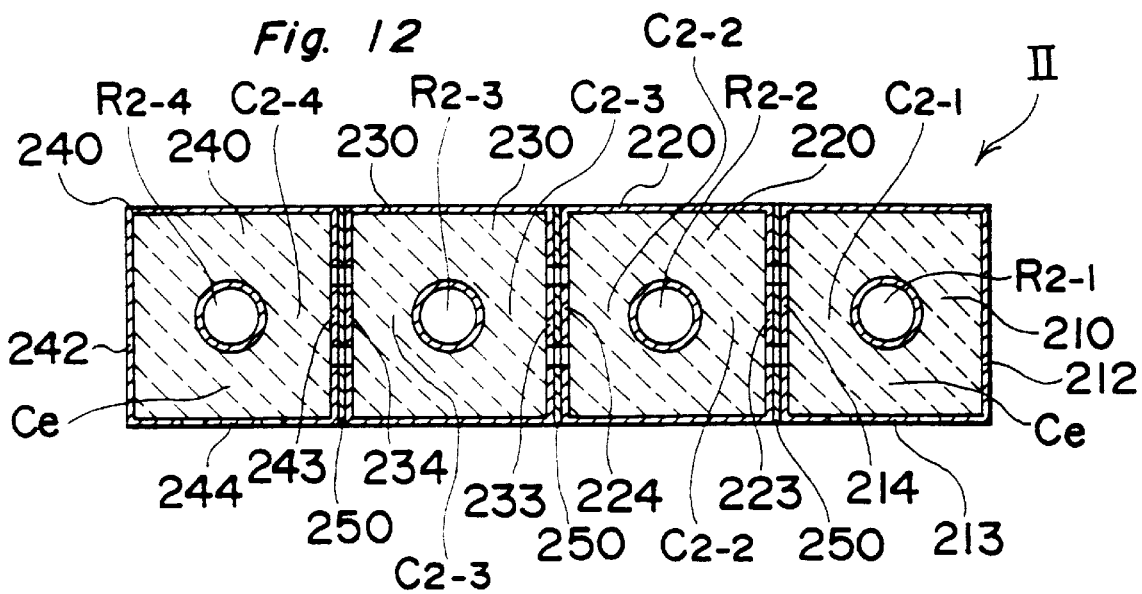
FIG. 12 is a cross sectional view taken along the line F—F of FIG. 10.
Figure 13:
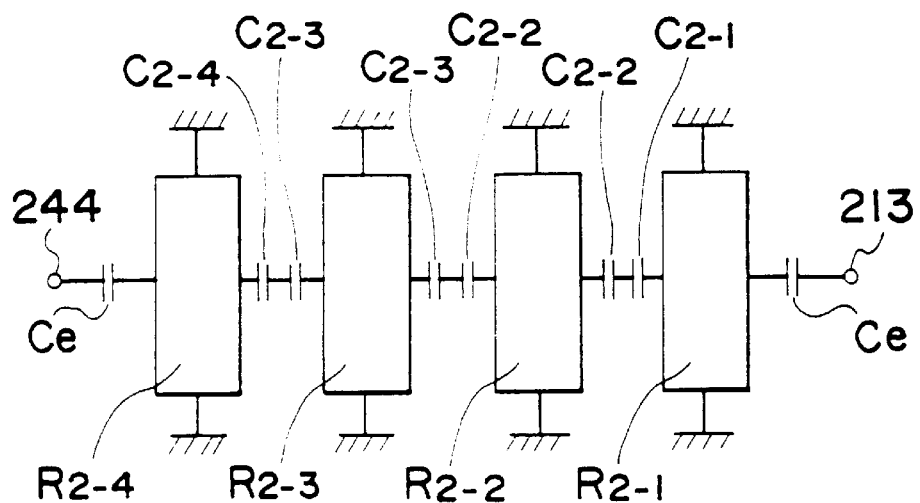
FIG. 13 is an equivalent circuit diagram of the filter II of FIG. 10.
Figure 14:
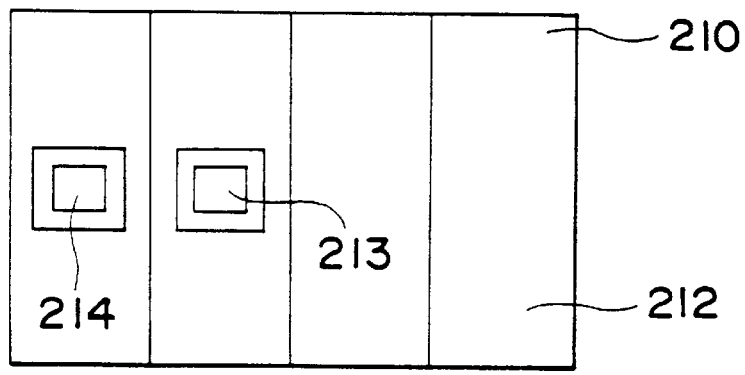
FIG. 14 is a development diagram of four side surfaces of a first dielectric block 210 in FIG. 10.

FIG. 11 is a cross section along the line D—D of FIG. 10, FIG. 12 is a cross section along the line F—F of FIG. 10, and FIG. 13 is an equivalent circuit diagram of the filter II. FIG. 14 shows a development diagram of four side surfaces of the first dielectric block 210, FIG. 15 and FIG. 16 being development diagrams of four side surfaces of the second (third) dielectric block 220 (230), and the fourth dielectric block 240, respectively.

The first dielectric block 210 is formed of a dielectric material, for example, a ceramic dielectric in the configuration of a generally rectangular parallelepiped. The first dielectric block 210 has a top surface, a bottom surface, a front side surface, a rear side surface, a left side surface and a right side surface. An opening 211 spanning through the central part of the first block 210 is opened at the front and rear side surfaces of the block, thereby to constitute a first resonator R2-1.

In the first dielectric block 210, the outer surfaces of the six surfaces and the inner surface of the opening 211 are coated with a thin conductive film 212 by a well-known electrode film forming method using a conductive material such as silver, copper or the like. The conductive coating 212 at the top, bottom, right side and left side surfaces of the first dielectric block 210 is formed as shown in FIG. 14. As shown in FIG. 14, a rectangular part not coated with the conductive film where the dielectric block is exposed is provided at the bottom surface of the dielectric block in an area where a superior energy component of the electric field exists. An island in the exposed part which is coated with the conductive film is used as a first input coupling electrode 213. Further, a rectangular part not coated with the conductive film where the dielectric block is exposed is formed at the left side surface of the dielectric block, also where the electric field has its superior energy component, and an island in the above part, coated with the conductive film, is a first output coupling electrode 214.

As represented in the equivalent circuit diagram of FIG. 13, the first dielectric block 210 has a resonator R2-1 defined by the opening 211 of the dielectric body, while an external coupling capacitance Ce is formed between the inner surface of the opening 211 and the bottom surface of the block, while an internal coupling capacitance C2-1 is formed between the inner surface of the opening 211 and the left side surface of the block. In other words, the first dielectric block 210 has the first input coupling electrode 213 which is to serve as an input terminal of the filter II at the bottom surface of the dielectric block to couple an input signal with the resonator R2-1, and has the first output coupling electrode 214 at the left side surface of the dialectic block.

The second dielectric block 220 is made of a dielectric material, e.g. a ceramic dielectric and generally formed in a rectangular parallelepiped of approximately the same size as the first dielectric block 210, having a top surface, a bottom surface, a front side surface, a rear side surface, a left side surface and a right side surface. An opening 221 opened at the front side and rear side surfaces of the second dielectric block 220 penetrates the central part of the block, constituting a second resonator R2-2.

Figure 15:
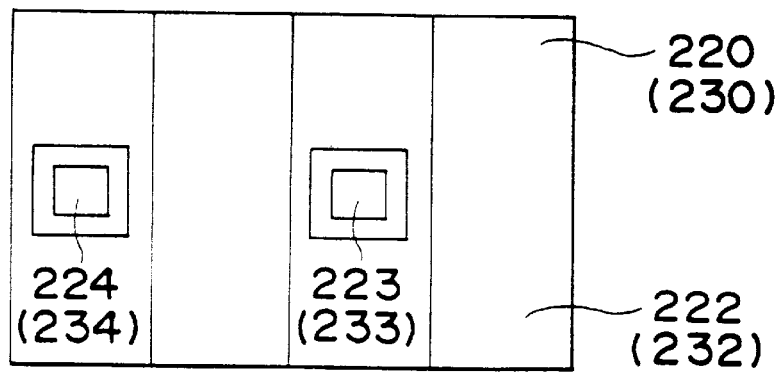
FIG. 15 is a development diagram of four side surfaces of a second (and third) dielectric block 220 (230) in FIG. 10.

The six outer surfaces of the above surfaces and the inner surface of the opening 221 of the second dielectric block 220 except for some portions to be described below are coated with a thin film of a conductive material 222 according to a known electrode film forming method with the use of a conductive material such as silver or copper. The conductive coating 222 at the top surface, bottom surface, right side surface and left side surface of the second dielectric block 220 is formed as shown in FIG. 15. As is understood from FIG. 15, an exposed part where the dielectric block is exposed is formed at the right side surface of the dielectric block where the energy component of the electric field is strong. The rectangular exposed part is not coated with the conductive film. An island covered with the conductive film within the exposed part becomes a second input coupling electrode 223. There is a rectangular exposed part also at the left side surface of the dielectric block in an area with the superior energy component of the electric field, which is not coated with the conductive film, and therefore the dielectric block is exposed. An island coated with the conductive film and formed in the exposed part becomes a second output coupling electrode 224.

In the second dielectric block 220 in the above-described structure, as represented in the equivalent circuit diagram of FIG. 13, the resonator R2-2 is defined by the opening 221 of the dielectric block, and internal coupling capacitances C2-2 are formed between the inner surface of the opening 221 and the right side surface of the block, and between the inner surface of the opening 221 and the left side surface of the block, respectively. That is, the second dielectric block 220 is provided with the second input coupling electrode 223 at the right side surface of the block in order to couple an input signal with the resonator R2-2, along with the second output coupling electrode 224 at the left side surface of the block.

The third dielectric block 230 formed of a dielectric material such as a ceramic dielectric or the like is generally a rectangular parallelepiped of approximately the same size as the first dielectric block 210, having a top surface, a bottom surface, a front side surface, a rear side surface, a left side surface and a right side surface. Similar to the second dielectric block 220 in structure, the third dielectric block 230 has an opening 231 opened at the front side and rear side surfaces thereof through the central part of the block, where a third resonator R2-3 is defined by the opening 231.

The six outer surfaces and the inner surface of the opening 231 of the third dielectric block 230 except for some portions which will be explained later are coated with a conductive thin film 232 by a well-known electrode film forming method with the use of a conductive material such as silver, copper or the like. As indicated in FIG. 15, a rectangular exposed part where the dielectric block is exposed without the conductive film is provided at the right side surface of the block in an area with superior energy component of the electric field, and an island coated with the conductive film within the exposed part is a third input coupling electrode 233. Moreover, the left side surface of the dielectric block where the higher energy component of the electric field exists is partly exposed and not coated with the conductive film. An island coated with the conductive film within the exposed part is used as a third output coupling electrode 234.

In the third dielectric block 230 in the above-described structure, as is clear from the equivalent circuit diagram of FIG. 13, the opening 231 constitutes the resonator R2-3, and internal coupling capacitances C2-3 are formed respectively between the inner surface of the opening 231 and the right side surface and between the inner surface of the opening 221 and the left side surface of the block. In other words, the third dielectric block 230 has the second input coupling electrode 233 at the right side surface thereof to couple an input signal with the resonator R2-3 and the third output coupling electrode 234 at the left side surface thereof.

The fourth dielectric block 240, formed of a dielectric material, for example, a ceramic dielectric, having a top surface, a bottom surface, a front side surface, a rear side surface, a left side surface and a right side surface, is a generally rectangular parallelepiped of approximately the same size as the first dielectric block 210. An opening 241 of the fourth dielectric block 240 passes through the central part of the block and opens at the front side and rear side surfaces of the block, thus constituting a fourth resonator R2-4.

Figure 16:
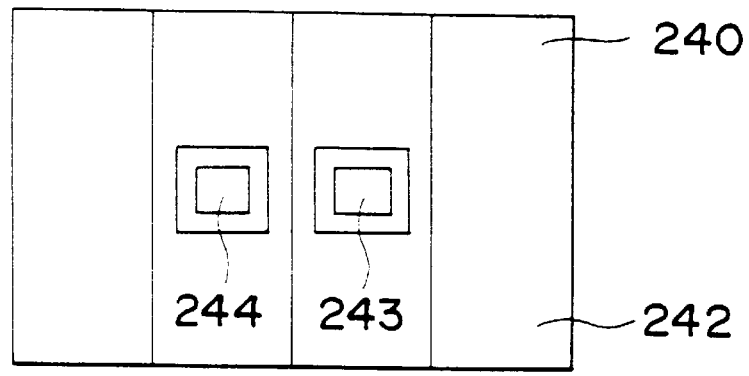
FIG. 16 is a development diagram of four side surfaces of a fourth dielectric block 240 in FIG. 10.

The fourth dielectric block 240 is covered with a thin conductive film 242 formed on the six outer surfaces thereof and the inner surface of the opening 241, except for some portions to be described later, by a known electrode film forming method and a conductive material like silver, copper, etc. The conductive film 242 covering the top surface, bottom surface, right side surface and left side surface of the fourth dielectric block 240 is formed in a manner as illustrated in FIG. 16. As is clear in FIG. 16, a rectangular part not coated with the conductive film where the dielectric block is exposed is provided at the right side surface of the block in an area where the energy component of the electric field is predominant. A fourth input coupling electrode 243 is provided by an island coated with the conductive film within the exposed part. Another rectangular part not coated with the conductive film where the dielectric block is exposed is formed at the bottom surface of the block in an area showing a more intense energy component of the electric field, and a fourth output coupling electrode 244 is formed at an island coated with the conductive film within the exposed part.

As indicated in the equivalent circuit diagram of FIG. 13, the resonator R2-4 of the fourth dielectric block 240 is defined by the opening 241, and an internal coupling capacitance C2-4 is formed between the inner surface of the opening 241 and the right side surface of the block, while an external coupling capacitance Ce is formed between the inner surface of the opening 241 and the bottom source of the block. In other words, the fourth input coupling electrode 243 of the fourth dielectric block 240 is provided at the right side surface of the block so as to couple an input signal with the resonator R2-4, and the fourth output coupling electrode 244 which serves as an output terminal of the filter II is formed at the bottom surface of the block.

The above four dielectric blocks 210, 220, 230 and 240 are aligned in the lateral direction so that the left side surface of the first dielectric block 210 faces the right side surface of the second dielectric block 220, the left side surface of the second dielectric block 220 confronts the right side surface of the third dielectric block 230, and the left side surface of the third dielectric block 230 confronts the right side surface of the fourth dielectric block 240. When the dielectric blocks are bonded integrally to one another via a conductive adhesive material, the rectangular parallelepiped filter II of FIG. 10 is obtained. In the equivalent circuit of the filter, as shown in FIG. 13, the resonators R2-1, R2-2, R2-3 and R2-4 are connected via the internal coupling capacitances C2-1, C2-2, C2-3 and C2-4, and the external coupling capacitances Ce are provided at both ends of the filter.

More specifically, the part 212 coated with the conductive film at the left side surface of the first dielectric block 210 is integrally bonded to the corresponding part 222 coated with the conductive film at the right side surface of the adjacent second dielectric block 220 except for the exposed part by means of a conductive bonding material 250, e.g., a solder, a conductive adhesive containing silver powder or the like, and the first output coupling electrode 214 formed at the left side surface of the first dielectric block 210 is integrally bonded to the second input coupling electrode 223 formed at the right side surface of the second dielectric block 220 via the conductive adhesive material 250.

The part 222 coated with the conductive film at the left side surface of the second dielectric block 220 is integrally bonded to the part 232 coated with the conductive film at the right side surface of the third dielectric block 230 by the conductive adhesive material 250. At the same time, the second output coupling electrode 224 at the left side surface of the second dielectric block 220 is integrally bonded to the third input coupling electrode 233 formed at the right side surface of the third dielectric block 230 via the same conductive adhesive material 250.

The part 232 coated with the conductive film at the left side surface of the third dielectric block 230 is integrally bonded to the part 242 coated with the conductive film at the right side surface of the fourth dielectric block 240, except for the exposed part, via the adhesive conductive material 250. The third output coupling electrode 234 at the left side surface of the third dielectric block 230 is integrally bonded with the fourth input coupling electrode 243 formed at the right side surface of the fourth dielectric block 240 via the conductive adhesive material 250.

Third Embodiment

FIGS. 17–23 represent a third embodiment of the present invention.

Figure 17:
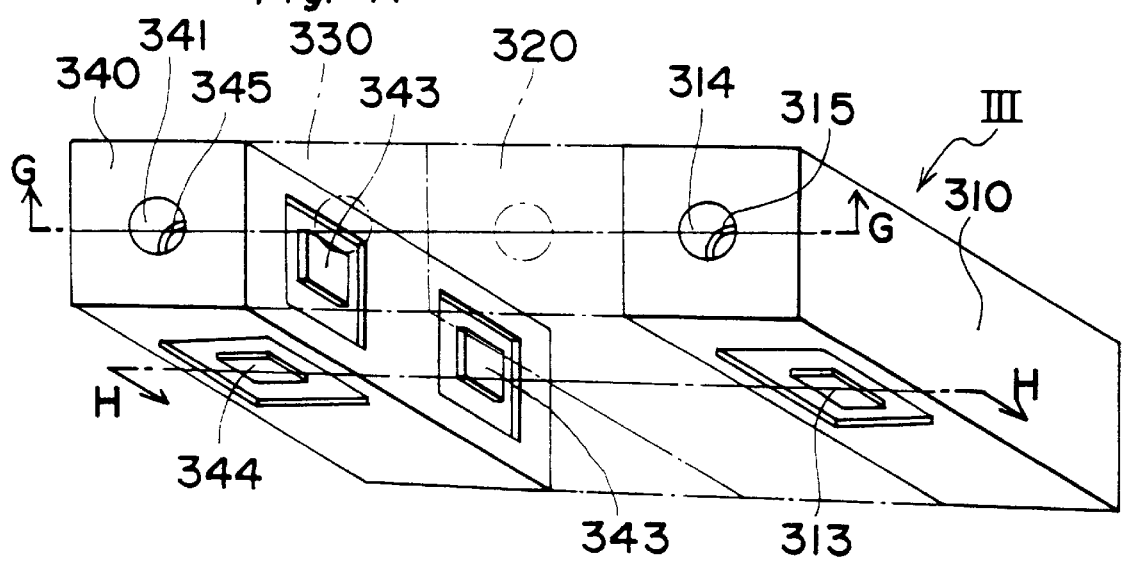
FIG. 17 is a perspective view of a filter III according to a third embodiment of the present invention.

A filter III in FIG. 17 is formed of first through fourth dielectric blocks 310, 320, 330 and 340, respectively, which are combined in a single unit. The filter III is an example of a capacitive coupling resonator open-circuited in the vicinity of both ends thereof and resonating at a length $\lambda/2$, where $\lambda$ is the resonant wavelength. The first and fourth dielectric blocks 310 and 340 are indicated by solid lines, while the second and third dielectric blocks 320 and 330 are shown with imaginary lines in FIG. 17.

Figure 18:
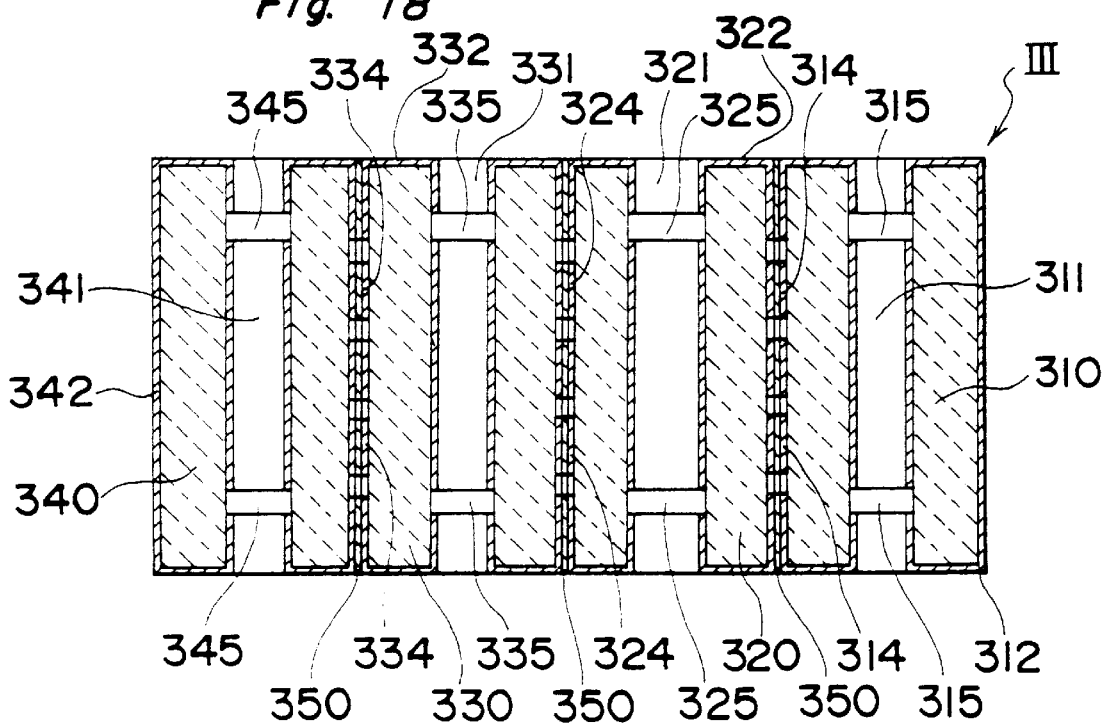
FIG. 18 is a cross sectional view taken along the line G—G of FIG. 17.
Figure 19:
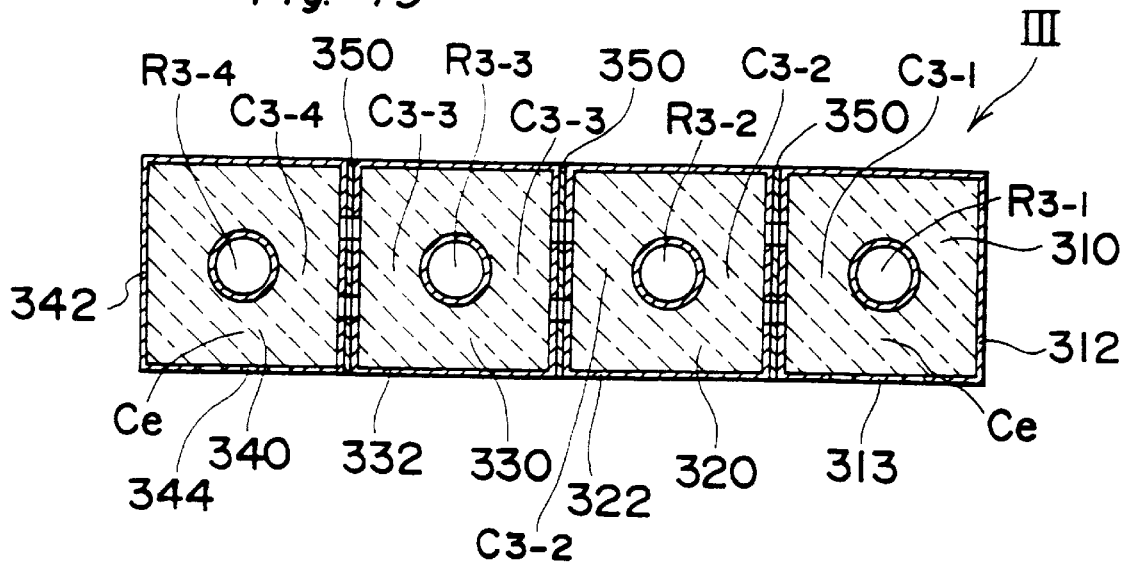
FIG. 19 is a cross sectional view taken along the line H—H of FIG. 17.
Figure 20:
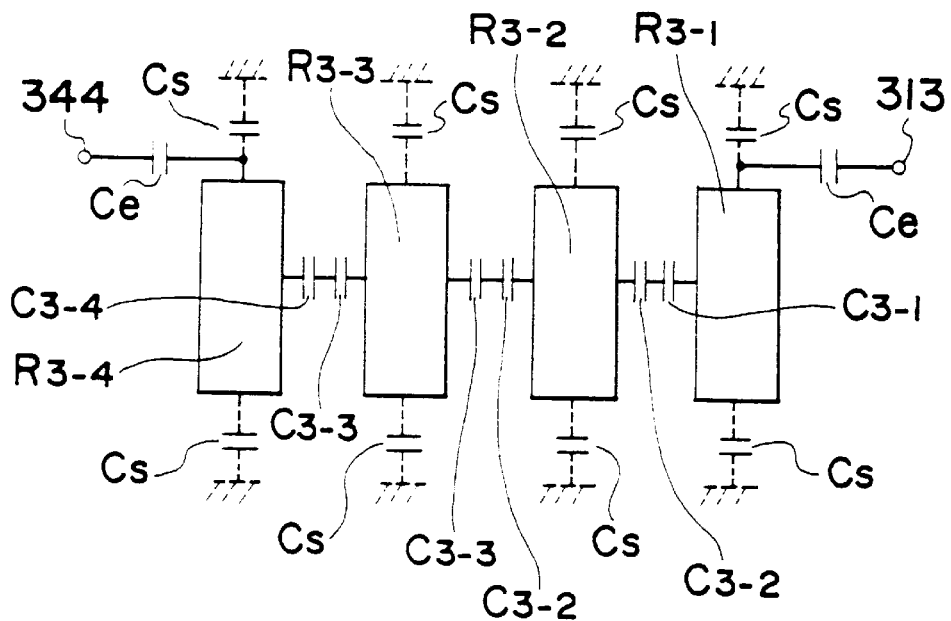
FIG. 20 is an equivalent circuit diagram of the filter III of FIG. 17.
Figure 21:
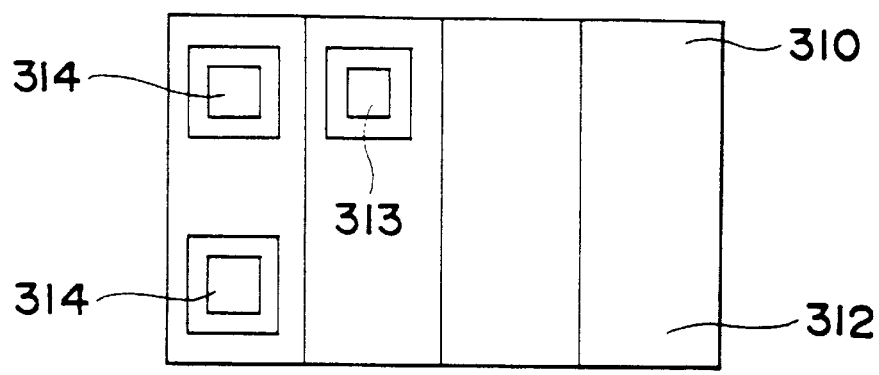
FIG. 21 is a development diagram of four side surfaces of a first dielectric block 310 in FIG. 17.
Figure 22:
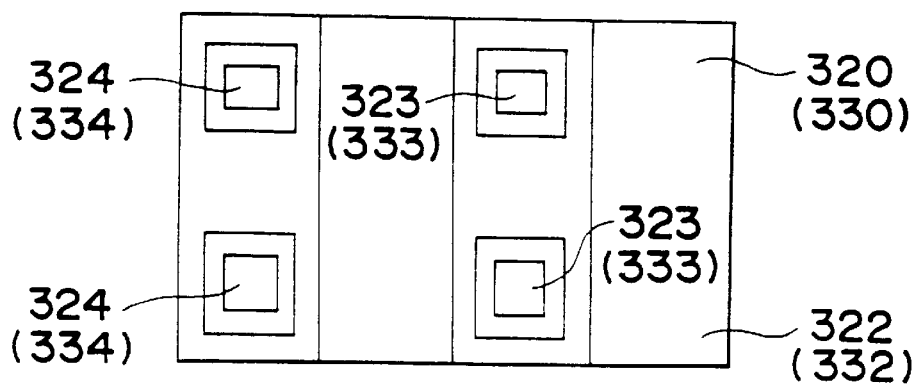
FIG. 22 is development diagram of four side surfaces of a second (and third) dielectric block 320 (330) in FIG. 17.
Figure 23:
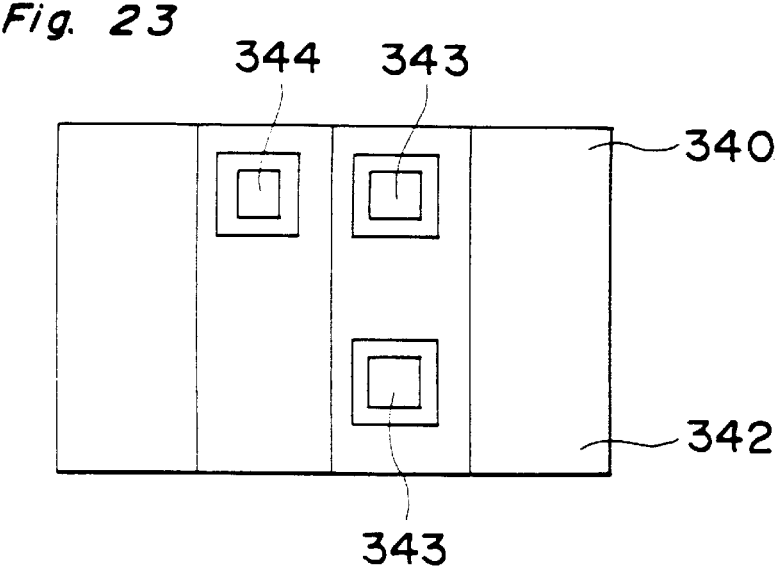
FIG. 23 is a development diagram of four side surfaces of a fourth dielectric block 340 in FIG. 17.

FIG. 18 is a cross sectional view taken along the line G—G of FIG. 17. FIG. 19 is a cross sectional view along the line H—H of FIG. 17. FIG. 20 is an equivalent circuit diagram of the filter III. FIG. 21 shows a development diagram of the four side surfaces of the first dielectric block 310. FIG. 22 is a development diagram of four side surfaces of the second and third dielectric blocks 320 (330). FIG. 23 is a development diagram of the fourth dielectric block 340.

The first dielectric block 310 is made of a dielectric material, e.g., a ceramic dielectric, and has the configuration of a generally rectangular parallelepiped with a top surface, a bottom surface, a front side surface, a rear side surface, a left side surface and a right side surface. Moreover, the dielectric block 310 has an opening 311 extending between the front and rear side surfaces, where the opening 311 defines a first resonator R3-1.

Except for portions to be described later, the outer six surfaces and the inner surface of the opening 311 of the first dielectric block 310 are coated with a thin film of a conductive coating 312 according to a known electrode film forming method using a conductive material such as silver or copper. The conductive coating 312 at the top end surface, bottom end surface, right side surface and left side surface of the first dielectric block 310 is formed as shown in the development diagram of FIG. 21. As shown in FIG. 21, a rectangular exposed area (where the dielectric block is exposed without the conductive film coating) is provided at the bottom surface of the block in an area where the energy component of the electric field is predominant, and a first input coupling electrode 313 is formed inside the exposed area. Moreover, two additional exposed areas are provided at the left side surface of the dielectric block in the predominant area of the energy component of the electric field. A pair of first output coupling electrodes 314 (FIG. 21) are formed inside exposed areas on the left side surface of the dielectric block. As is readily understood from FIG. 18, there are also two ring-shaped exposed areas having a small width 315 formed in the inner surface of the opening 311 near the front and rear side end surfaces of the dielectric block.

In the first dielectric block 310 of the above-discussed structure, as indicated in the equivalent circuit diagram of FIG. 20, the resonator R3-1 is defined by the opening 311, and an external coupling capacitance Ce is formed between the inner surface of the opening 311 and the bottom surface of the block, and an internal coupling capacitance C3-1 is defined between the inner surface of the opening 311 and the left side surface of the block. In other words, the first input coupling electrode 313 to be an input terminal of the filter III is provided at the bottom surface of the block so as to couple an input signal with the resonator R3-1, while the first output coupling electrodes 314 are formed at the left side surface of the block. A pair of stray capacitances Cs are formed at the exposed ring-shaped parts 315 in the inner surface of the opening 311.

The second dielectric block 320 is approximately the same size as the first dielectric block 310, and is formed in the shape of a generally rectangular parallelepiped from a dielectric material such as a ceramic dielectric with a top surface, a bottom surface, a front side surface, a rear side surface, a left side surface and a right side surface. An opening 321 of the second dielectric block 320 passes through the central part of the block and opens at the front and rear side surfaces of the block, thus constituting a second resonator R3-2.

The six outer surfaces and the inner surface of the opening 321 of the second dielectric block 320 are coated with a thin conductive film 322 except for portions to be described below. A commonly-used electrode film forming method using a conductive material, for example silver or copper, is employed to coat the film 322. The conductive film 322 at the top surface, bottom surface, right side surface and left side surface of the second dielectric block 320 is formed as shown in the development diagram of FIG. 22. As indicated in FIG. 22, there are two uncoated rectangular areas at the right side surface of the block in an area of the superior energy component of the electric field. Two input coupling electrodes 323 are formed in the exposed areas. Further, two output coupling electrodes 324 are provided at the exposed left surface of the dielectric block in an area where the energy component of the electric field is high. As is clear from FIG. 18, there are two further ring-shaped exposed areas 325 in the inner surface of the opening 321 near the front side end and rear side end surfaces of the block.

As represented by the equivalent circuit diagram of FIG. 20, the resonator R3-2 of the second dielectric block 320 is constituted of the opening 321, while internal coupling capacitances C3-2 are defined between the inner surface of the opening 321 and the right side surface, and between the inner surface of the opening 321 and the left side surface of the block. That is, the dielectric block 320 has the second input coupling electrodes 323 at the right side surface of the block so as to couple an input signal with the resonator R3-2, and the second output coupling electrodes 324 at the left side surface of the block. At the same time, a pair of stray capacitances Cs are formed at the two ring-shaped exposed parts 325 in the inner surface of the opening 321.

The third dielectric block 330 is a generally rectangular parallelepiped formed of a ceramic dielectric or the like of approximately the same size as the first dielectric block 310. The third dielectric block 330 is of a similar structure as the second dielectric block 320, having a top end surface, a bottom end surface, a front side surface, a rear side surface, a left side surface and a right side surface. An opening 331 passes through the central part of the block 330 and opens at the front and rear side surfaces to define a third resonator R3-3.

The third dielectric block 330 is coated with a conductive thin film 332 on the six outer surfaces and the inner surface of the opening 331 except for the part to be described below. The thin film 332 is formed using a known electrode film forming method. As shown in FIG. 22, two areas are exposed, each in the shape of a rectangle, in an area having a high energy component of the electric field. These two areas are located on the right side surface of the third dielectric block, and are not coated with the conductive film. Two input coupling electrodes 333 are formed in the exposed areas. In the same manner as described above, two output coupling electrodes 334 are disposed at the left side surface of the dielectric block in an area where the electric field has a predominant energy component. As is clear from FIG. 18, two ring-shaped exposed areas 335 are provided on the inner surface of the opening 331 near the front and rear surfaces of the block. The exposed areas 335 are not coated with the conductive film.

As indicated in the equivalent circuit diagram of FIG. 20, the opening 331 defines the resonator R3-3, while two internal coupling capacitances C3-3 are formed between the inner surface of the opening 331 and the right side surface and between the inner surface of the opening 331 and the left side surface of the block, respectively. The third dielectric block 330 has the third input coupling electrodes 333 at the right side surface thereof to couple an input signal to the resonator R3-3 and has the third output coupling electrodes 334 at the left side surface thereof. A pair of stray capacitances Cs are formed at the two exposed areas 335 on the inner surface of the opening 331.

The fourth dielectric block 340 is made of a dielectric material, e.g., a ceramic dielectric or the like, and has a generally rectangular parallelepiped shape of approximately the same size as the first dielectric block 310. The block 340 has a top surface, a bottom surface, a front side surface, a rear side surface, a left side surface and a right side surface. The fourth dielectric block 340 has an opening 341 passing through the central part of the block 340 and opening at the front side and rear side surfaces which forms a fourth resonator R3-4.

The fourth dielectric block 340 is coated with a thin conductive coating film 342 on the six outer surfaces of the block 340 and on the inner surface of the opening 341, except for portions to be discussed below. The film 342 is formed using a known electrode film forming method. The film 342 is made of a conductive material such as silver, copper, or the like. The conductive coating film 342 at the top surface, bottom surface, right side surface and left side surface of the block 340 is disposed as shown in FIG. 23. There are two rectangular exposed areas which are not coated at the right side surface of the dielectric block in an area having a high energy component of the electric field. Fourth input coupling electrodes 343 are disposed on the exposed areas. Further, a rectangular exposed area is provided at the bottom surface of the dielectric block where a predominant energy component of the electric field exists. This exposed area is not coated with the conductive film. A fourth output coupling electrode 344 is disposed on this exposed area. As indicated in FIG. 18, there are two ring-shaped exposed areas 345 having a small width located near the front and rear side surfaces of the block on the inner surface of the opening 341.

As shown in the equivalent circuit diagram of FIG. 20, the fourth dielectric block 340 has an internal coupling capacitance C3-4 between the inner surface of the opening 341 and the right side surface of the block, and an external coupling capacitance Ce formed between the inner surface of the opening 341 and the bottom surface of the block. The fourth dielectric block 340 has the first input coupling electrode 343 at the right side surface thereof to couple an input signal to the resonator R3-4. The fourth output coupling electrode 344, an output terminal of the filter III, is disposed on the bottom surface of the block. A pair of stray capacitances Cs are obtained at the ring-shaped exposed areas 345 on the inner surface of the opening 341.

The above four dielectric blocks 310, 320, 330 and 340 are aligned side by side such that the left side surface of the first dielectric block 310 abuts the right side surface of the second dielectric block 320, the left side surface of the second dielectric block 320 abuts the right side surface of the third dielectric block 330 and the left side surface of the third dielectric block 330 abuts the right side surface of the fourth dielectric block 340. The dielectric blocks 310, 320, 330 and 340 are integrally bonded via a conductive bonding material. Thus, the filter III has a rectangular parallelepiped shape (FIG. 17). The resonators R3-1, R3-2, R3-3 and R3-4 of the filter III are connected via internal coupling capacitances C3-1, C3-2, C3-3 and C3-4 as shown in the equivalent circuit diagram of FIG. 20, and the external coupling capacitances Ce are provided at both ends of the filter. It is noted that the stray capacitances Cs are so small that they may be negligible.

More specifically, the part 312 coated with the conductive film at the left side surface of the first dielectric block 310 is integrally bonded to the part 322 coated with the conductive film at the right side surface of the adjacent second dielectric block 320. However, the exposed part is bonded via a solder or conductive bonding material 350 such as a conductive adhesive containing silver powder. The first output coupling electrodes 314 at the left side surface of the first dielectric block 310 are coupled to the second input coupling electrodes 323 at the right side surface of the second dielectric block 320 via the conductive adhesive material 350.

The part 322 coated with the conductive film at the left side surface of the second dielectric block 320 is bonded to the part 332 coated with the conductive film at the right side surface of the corresponding third dielectric block 330 via solder or conductive adhesive material 350 containing, for example, silver powder. The second output coupling electrodes 324 at the left side surface of the second dielectric block 320 are integrally bonded to the third input coupling electrodes 333 formed at the right side surface of the third dielectric block 330 via solder or conductive adhesive material 350 containing, for example, silver powder.

The part 332 (coated with the conductive film) is bonded at the left side surface of the third dielectric block 330 to the part 342 (coated with the conductive film) at the right side surface of the adjacent fourth dielectric block 340 via solder or conductive adhesive material 350 containing silver powder. The third output coupling electrodes 334 are coupled at the left side surface of the third dielectric block 330 to the corresponding fourth input coupling electrodes 343 formed at the right side surface of the fourth dielectric block 340 via solder or conductive adhesive material 350 containing silver powder.

Fourth Embodiment

A fourth embodiment of the present invention will be discussed with reference to FIGS. 24–30.

Figure 24:
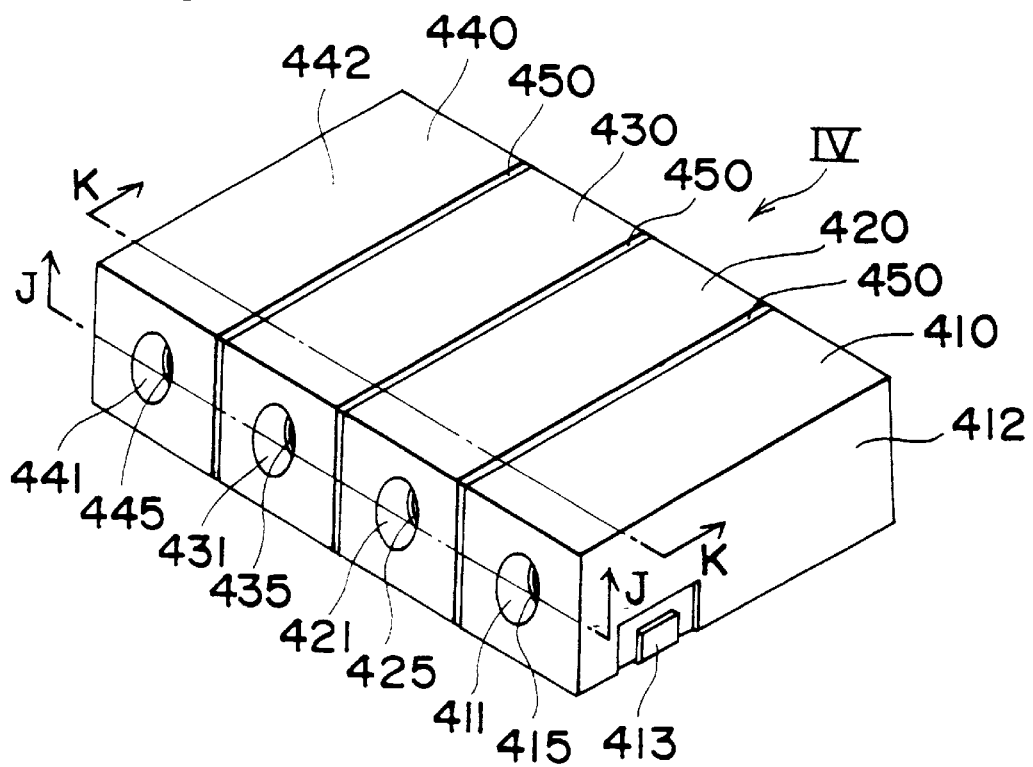
FIG. 24 is a perspective view of a filter IV according to a fourth embodiment of the present invention.

A filter IV in FIG. 24 consists of four blocks, i.e., first through fourth dielectric blocks 410, 420, 430 and 440, respectively, in one unit, representing an example of an inductive coupling resonator having one end short-circuited and the vicinity of the other end open-circuited which resonates at a length $\lambda/4$, where $\lambda$ is the resonant wavelength.

Figure 25:
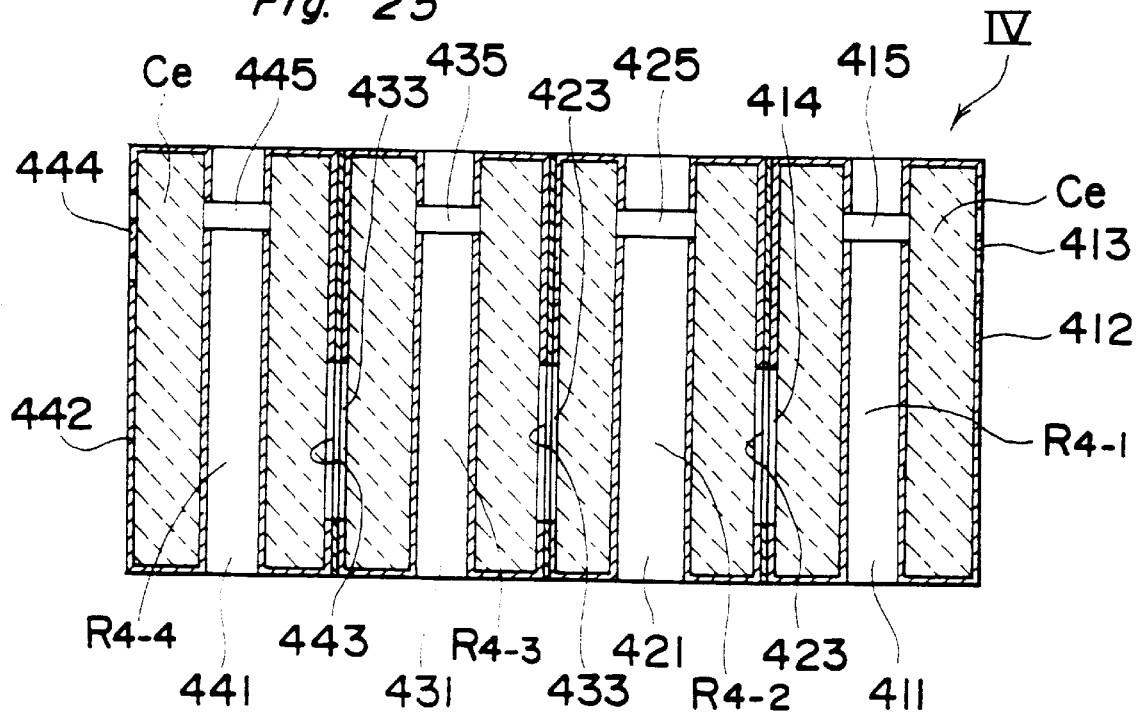
FIG. 25 is a cross sectional view taken along the line J—J of FIG. 24.
Figure 26:
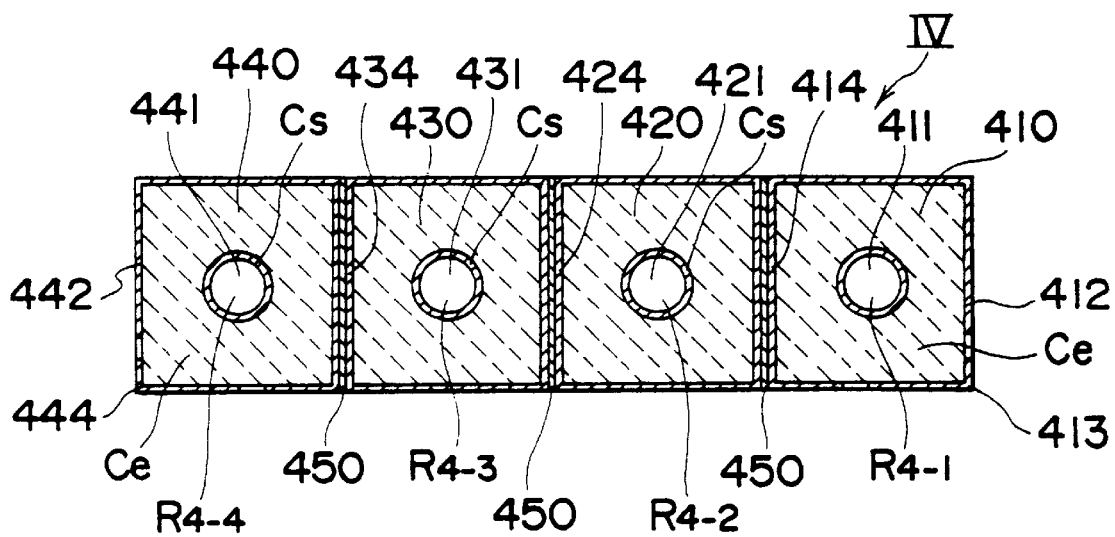
FIG. 26 is a cross sectional view taken along the line K—K of FIG. 24.
Figure 27:
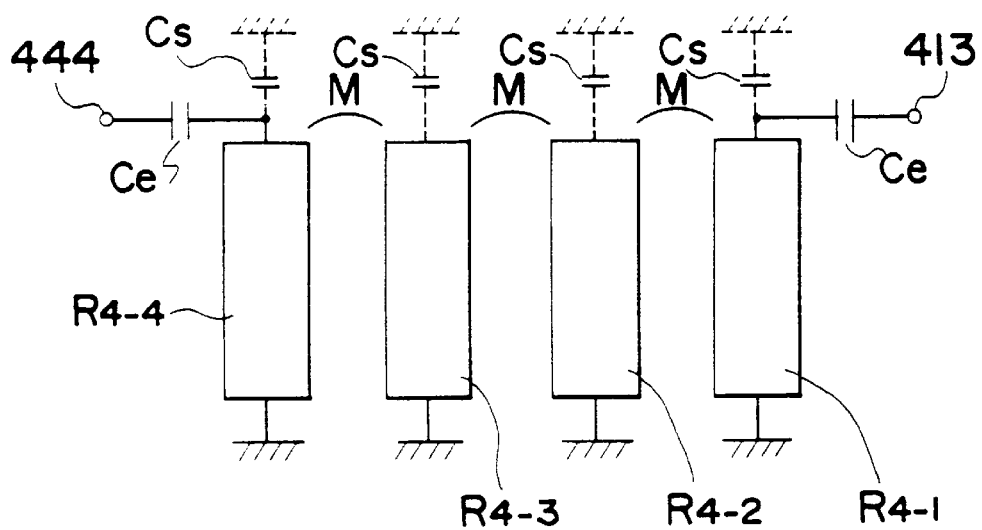
FIG. 27 is an equivalent circuit diagram of the filter IV of FIG. 24.
Figure 28:
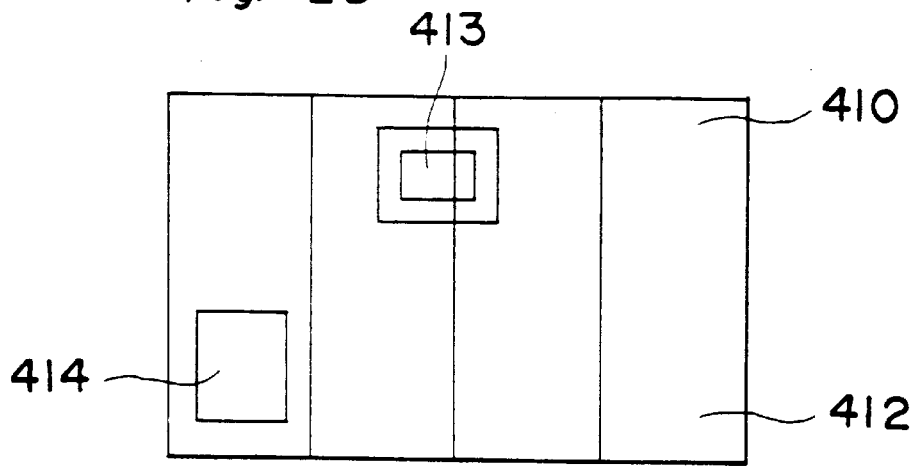
FIG. 28 is a development diagram of four side surfaces of a first dielectric block 410 in FIG. 24.
Figure 29:
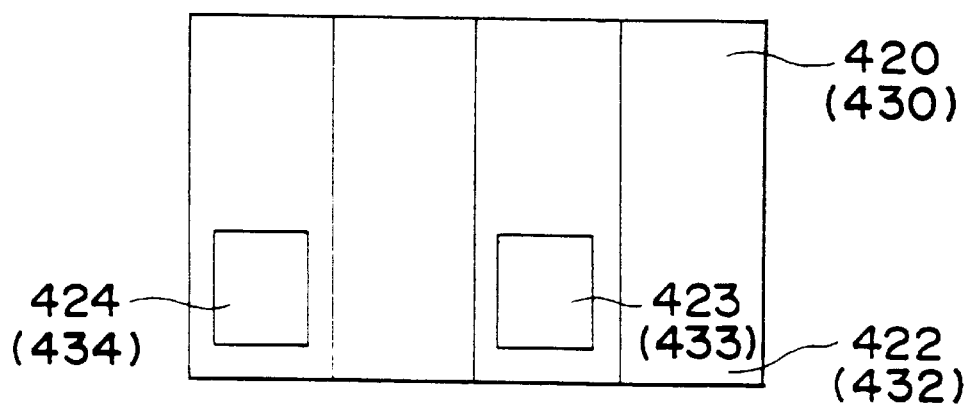
FIG. 29 is a development diagram of four side surfaces of a second (and third) dielectric block 420 (430) in FIG. 24.
Figure 30:
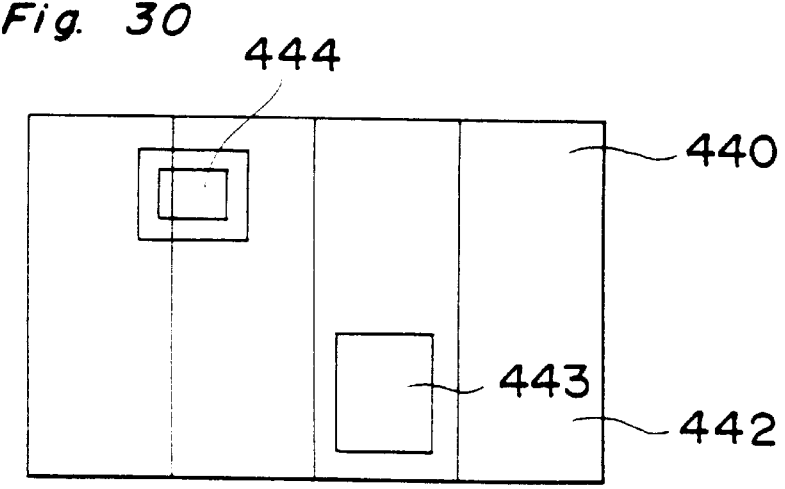
FIG. 30 is a development diagram of four side surfaces of a fourth dielectric block 440 in FIG. 24.

FIGS. 25 and 26 are cross sectional views respectively taken along the line J—J and K—K of FIG. 24. FIG. 27 indicates an equivalent circuit diagram of the filter IV. FIG. 28 is a development diagram of four side surfaces of the first dielectric block 410 and FIG. 29 is a development diagram of four side surfaces of the second and third dielectric blocks 420 and 430, and FIG. 30 is a development diagram of four side surfaces of the fourth dielectric block 440.

The first dielectric block 410 is formed of a dielectric material, e.g. a ceramic dielectric or the like in a generally rectangular parallelepiped, having a top surface, a bottom surface, a front side surface, a rear side surface, a left side surface and a right side surface. An opening 411 passing through the central part of the first dielectric block 410 opens at the front side and rear side surfaces of the block thereby to constitute a first resonator R4-1.

The first dielectric block 410 is covered with a thin film of a conductive coat 412 at the outer surfaces of the above six surfaces and the inner surface of the opening 411 except for some portions to be depicted later, where a known electrode film forming method using a conductive material such as silver or copper is used to form the thin film. The conductive film 412 at the top surface, bottom surface, right side surface and left side surface of the first dielectric block 410 is so formed as to be developed as illustrated in FIG. 28. As shown in FIG. 28, a rectangular exposed part where the dielectric block is exposed and the conductive film is not formed is provided in an area where the energy component of the electric field is predominant bridging the right side surface and the bottom surface of the dielectric block, where a part in the shape of an island in the exposed part, but coated with the conductive film, is used as a first input coupling electrode 413.

At the same time, a rectangular exposed part is secured in an area showing a superior energy component of the magnetic field at the left side surface of the dielectric block where the dielectric block is exposed without the coated conductive film, to obtain a magnetic field coupling window which serves as an inductive coupling window 414. Further, as shown in FIG. 25, a ring-shaped exposed part of small width is formed in the inner surface of the opening 411 at the closer side to the front surface of the dielectric block, which is exposed at the exposed part 415. As illustrated in the equivalent circuit diagram of FIG. 27, the first dielectric block 410 of the aforementioned structure has the resonator R4-1 formed of the opening 411, with the external coupling capacitance Ce between the inner surface of the opening 411, and the right side surface and bottom surface of the block and, the inductive coupling window 414 at the left side surface of the block. Therefore, the first dielectric block 410 has the first input coupling electrode 413 to be an input terminal of the filter IV at the right side surface and the bottom surface to couple an input signal with the resonator R4-1 and the first output coupling window 414 at the left side surface thereof. A stray capacitance Cs is formed at the ring-shaped exposed part 415 of the inner surface of the opening 411.

The second dielectric block 420 is made of a dielectric material such as a ceramic dielectric, etc. and has a top surface, a bottom surface, a front side surface, a rear side surface, a left side surface and a right side surface in a generally rectangular parallelepiped of approximately the same size as the first dielectric block 410. The second dielectric block 420 has an opening 421 which opens at the front side and rear side surfaces thereof which penetrates the central part of the block, and the opening 421 forms a second resonator R4-2.

A conductive thin film 422 is coated by a known electrode film forming technique at the outer surfaces of the six surfaces and the inner surface of the opening 421 of the second dielectric block 420, except for some portions to be described later, where a conductive material, e.g., silver or copper is used in the film forming method. The conductive film 422 at the top surface, bottom surface, right side surface and left side surface of the second dielectric block 420 are so formed as to be developed as shown in FIG. 29. More specifically, as in FIG. 29, the dielectric block is exposed at a rectangular part at the right side surface thereof, specifically in an area where the magnetic field shows a predominant energy component, and the dielectric block at the exposed part is not coated with the conductive film, and the exposed part is used as a second input coupling window 423 for the purpose of inductive coupling. Another exposed part is formed in an area of superior energy component of the magnetic field at the left side surface of the dielectric block 410 as well, where the rectangular exposed part is not coated with the conductive film and used as a second output coupling window 424 for inductive coupling. As indicated in FIG. 25, a ring-shaped exposed part 425 of small width is also provided in the inner surface of the opening 421 at the side closer to the front side surface of the dielectric block, which is not coated with the conductive film.

The second dielectric block 420 is formed in the above-described structure as shown in the equivalent circuit diagram of FIG. 27, where the second dielectric block has the resonator R4-2 formed of the opening 421, with the inductive coupling windows at the right side and the left side surfaces of the dielectric block. That is, the second input coupling window 423 is formed at the right side surface of the dielectric block to connect an input signal with the resonator R4-2, while the second output coupling window 424 is formed at the left side surface of the dielectric block. Moreover, a stray capacitance Cs is obtained by the ring-shaped exposed part 425 in the inner surface of the opening 421.

The third dielectric block 430 made of a dielectric material, for instance, a ceramic dielectric, etc. is of approximately the same size as the first dielectric block 410 and formed in a generally rectangular parallelepiped, with a top surface, a bottom surface, a front side surface, a rear side surface, a left side surface and a right side surface. The third dielectric block 430 in the construction similar to that of the second dielectric block 420 has an opening 431 which opens at the front and rear side surfaces thereof, and the opening 431 penetrates the central part of the dielectric block 430 to define a third resonator R4-3.

The third dielectric block 430 is coated with a thin conductive film 432 at the outer surfaces of the six surfaces and the inner surface of the opening 431 except for a part to be depicted later, while a conductive material such as silver or copper is used according to a general electrode film forming method. As shown in FIG. 29, a rectangular part where the dielectric block is exposed and the conductive film is not coated is provided at the right side surface of the block in an area with a superior energy component of the magnetic field, which works as a third input coupling window 433 for inductive coupling. Moreover, a rectangular part where the dielectric block is exposed and the conductive film is not coated is secured at the left side surface of the block in an area of intense energy component of the magnetic field, to define a third output coupling window 434 for the inductive coupling, and additionally, a ring-shaped exposed part 435 small in width is formed in the inner surface of the opening 431 at the side closer to the front side surface of the block, as in FIG. 25.

The third dielectric block 430 in the above constitution has, as represented in the equivalent circuit diagram of FIG. 27, the resonator R4-3 constituted of the opening 431 and the inductive coupling windows formed at the right side surface and the left side surface of the block. In other words, the third dielectric block has the third input coupling window 433 at the right side surface thereof to connect an input signal with the resonator R4-3 and the third output coupling window 434 at the left side surface thereof. At the same time, a stray capacitance Cs is formed at the ring-shaped exposed part 435 in the inner surface of the opening 431.

The fourth dielectric block 440 is made of a dielectric material, for example, a ceramic dielectric or a like material, and is a generally rectangular parallelepiped of approximately the same size as the first dielectric block 410, having a top surface, a bottom surface, a front side surface, a rear side surface, a left side surface and a right side surface. An opening 441 passing through the central part of the dielectric block 440 opens at the front and rear side surfaces of the block thereby to constitute a fourth resonator R4-4.

The fourth dielectric block 440 is covered with a thin conductive film 442 at the outer surfaces of the six surfaces and the inner surface of the opening 441 except for a part to be described later according to a general electrode film forming method with the use of a conductive material, for example, silver and copper. The conductive film 442 at the top, bottom, right side and left side surfaces of the fourth dielectric block 440 is so formed as to be developed as shown in FIG. 30. That is, a rectangular part is provided in an area of the superior energy component of the magnetic field at the right side surface of the dielectric block where the conductive film is not coated thereby to expose the dielectric block, which functions as a fourth input coupling window 443 for inductive coupling. Similarly, a rectangular exposed part is provided bridging the left side surface and the bottom surface of the dielectric block in an area where the energy component of the electric field is predominant, thereby to obtain a fourth output coupling electrode 444 in the shape of an island. The fourth output coupling electrode 444 is coated with the conductive film. Moreover, as shown in FIG. 25, a further exposed part 445 of small width is formed in the inner surface of the opening 441 at the closer side to the front side surface of the block, where the ring-shaped exposed part 445 is not coated with the conductive film and therefore the dielectric block is exposed.

As is clear in the equivalent circuit diagram of FIG. 27, the fourth dielectric block 440 of the above-discussed structure has the resonator R4-4 defined by the opening 441 and is provided with the inductive coupling window 443 at the right side surface, along with an external coupling capacitance Ce between the inner surface of the opening 441, and the left side surface and the bottom surface of the block. That is, the fourth input coupling window 443 is formed at the right side surface of the dielectric block to connect an input signal with the resonator R4-4 and the fourth output coupling electrode 444 as an output terminal of the filter IV is located bridging the left side surface and the bottom surface. A stray capacitance Cs is formed at the exposed part 445 in the inner surface of the opening 441.

The above four dielectric blocks are arranged laterally in a manner that the left side surface of the first dielectric block 410 is opposed to the right side surface of the second dielectric block 420, the left side surface of the second dielectric block 420 facing to the right side surface of the third dielectric block 430, and the left side surface of the third dielectric block 430 to the right side surface of the fourth dielectric block 440. Then, when the dielectric blocks in the above state are bonded together via a conductive adhesive material, the rectangular unit IV as shown in FIG. 24 is obtained as an example of a filter having one end short-circuited and the vicinity of the other end open-circuited. In the equivalent circuit diagram of the unit of FIG. 27, four resonators are connected via the inductive coupling windows and at the same time, external coupling capacitances Ce are provided at both ends of the unit. Each stray capacitance Cs in FIG. 27 is small enough to be negligible.

Specifically, the part 412 coated with the conductive film at the left side surface of the first dielectric block 410 is bonded with the part 422 coated with the conductive film at the right side surface of the adjacent second dielectric block 420 except for the exposed part by means of a conductive adhesive material 450 such as a solder, a conductive adhesive agent containing silver powder, etc. At the same time, the first output coupling window 414 formed at the left side surface of the first dielectric block 410 which is not coated with the conductive film thereby to expose the dielectric block is arranged to face the opposite second input coupling window 423 which is not coated with the conductive film at the right side surface of the second dielectric block 420, thereby inductively coupling the resonators R4-1 and R4-2.

The part 422 coated with the conductive film at the left side surface of the second dielectric block 420 is, on the other hand, bonded integrally with the part 432 which is coated with the conductive film at the right side surface of the third dielectric block 430 adjacent to the second block 420, by the adhesive conductive material 450 such as a solder or conductive adhesive agent containing silver powder. Moreover, the second output coupling window 424 formed at the left side surface of the second dielectric block 420 is arranged to face the third input coupling window 433 at the right side surface of the third dielectric window 430, thereby to achieve the inductive coupling of the resonators R4-2 and R4-3.

The part 432 coated with the conductive film at the left side surface of the third dielectric block 430 is integrally bonded to the part 442 coated with the conductive film at the right side surface of the corresponding fourth dielectric block 440 adjacent to the third dielectric block 430 except for the exposed part via the conductive adhesive material 450 such as a solder or a conductive adhesive agent containing silver powder, and the third output coupling window 434 at the left side surface of the third dielectric block 430 is opposed to the fourth input coupling window 443 formed at the right side surface of the fourth dielectric window 440 for the inductive coupling of the resonators R4-3 and R4-4.

Fifth Embodiment

A fifth embodiment of the present invention will now be described with reference to FIGS. 31–37.

Figure 31:
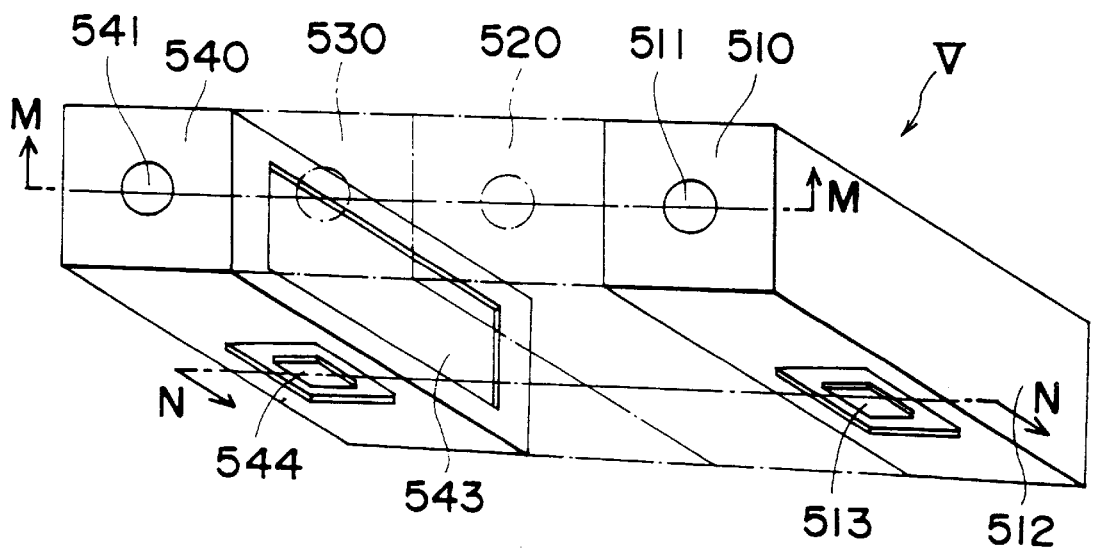
FIG. 31 is a perspective view of a filter V according to a fifth embodiment of the present invention.

A filter V of FIG. 31 is one unit composed of the first through fourth dielectric blocks 510, 520, 530 and 540, respectively, showing an example of an inductive coupling resonator which resonates at a length $\lambda/2$ and having both ends short-circuited.

Figure 32:
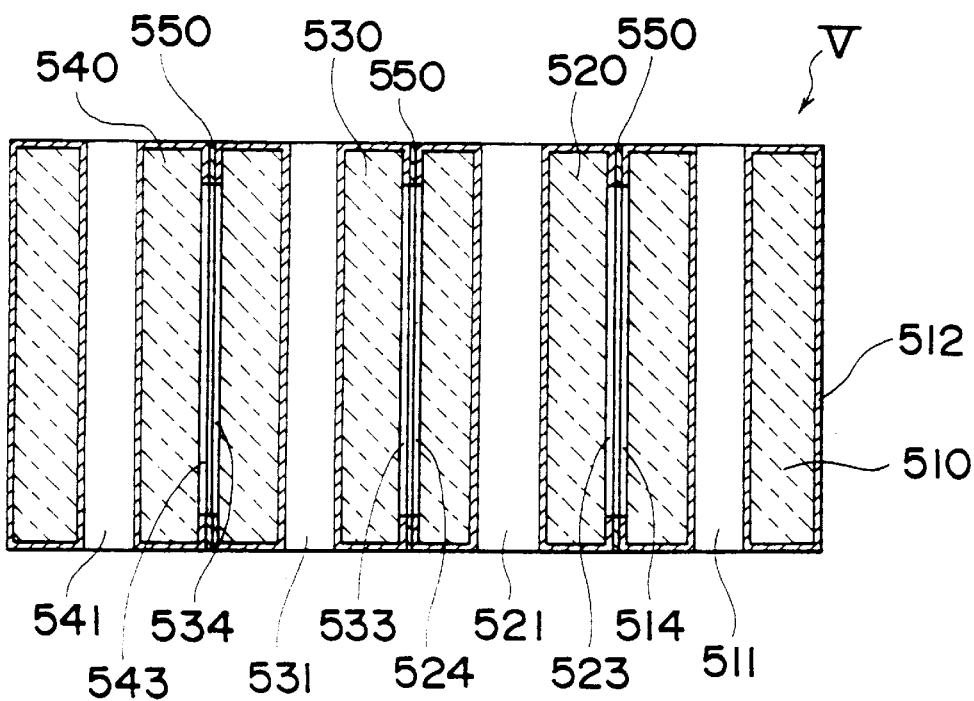
FIG. 32 is a cross sectional view taken along the line M—M of FIG. 31.
Figure 33:
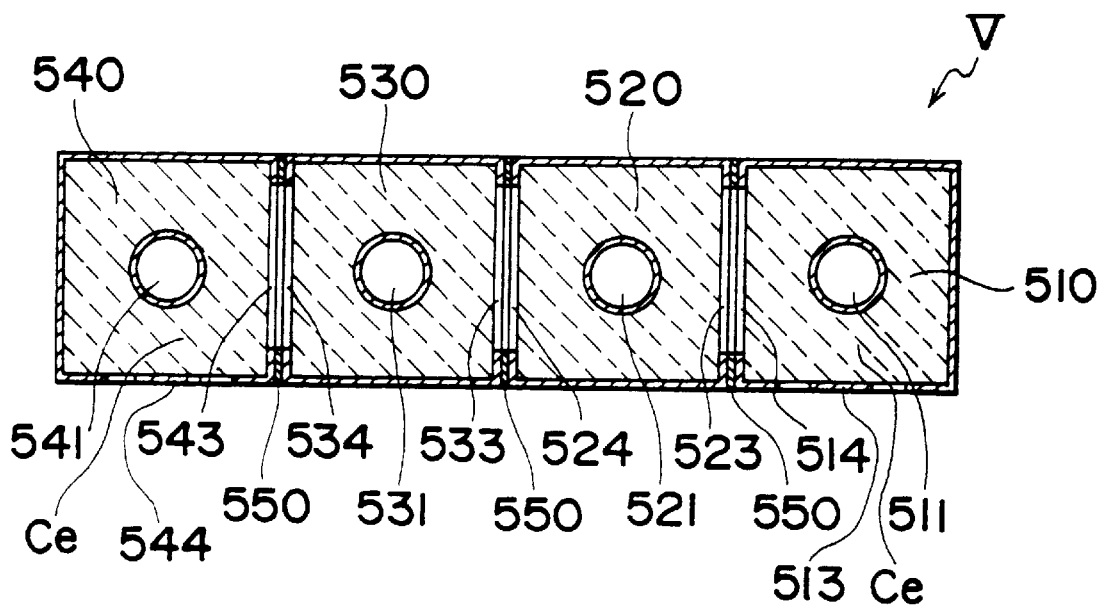
FIG. 33 is a cross sectional view taken along the line N—N of FIG. 31.
Figure 34:
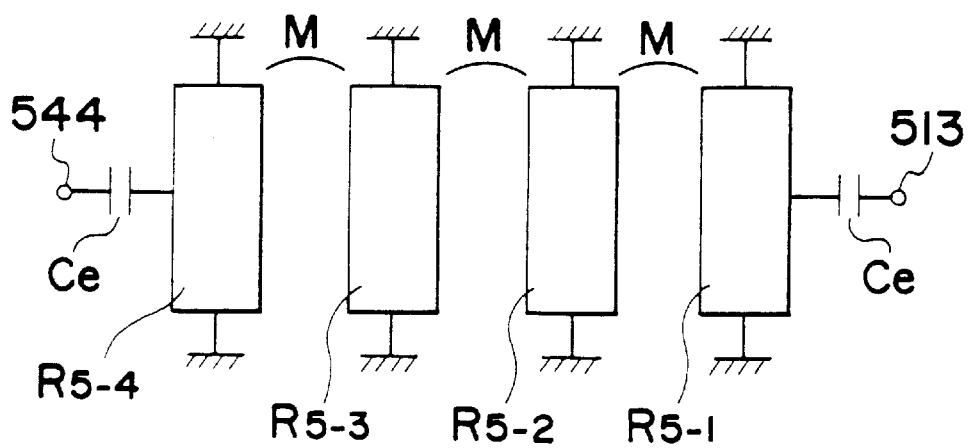
FIG. 34 is an equivalent circuit diagram of the filter V of FIG. 31.
Figure 35:
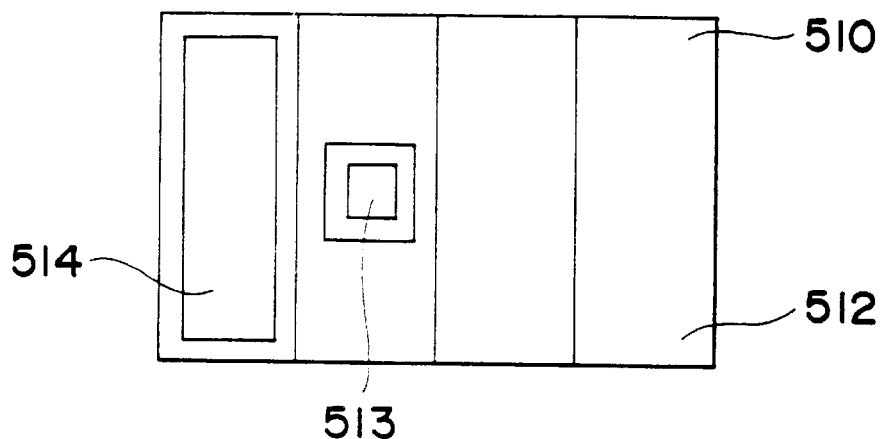
FIG. 35 is a development diagram of four side surfaces of a first dielectric block 510 in FIG. 31.
Figure 36:
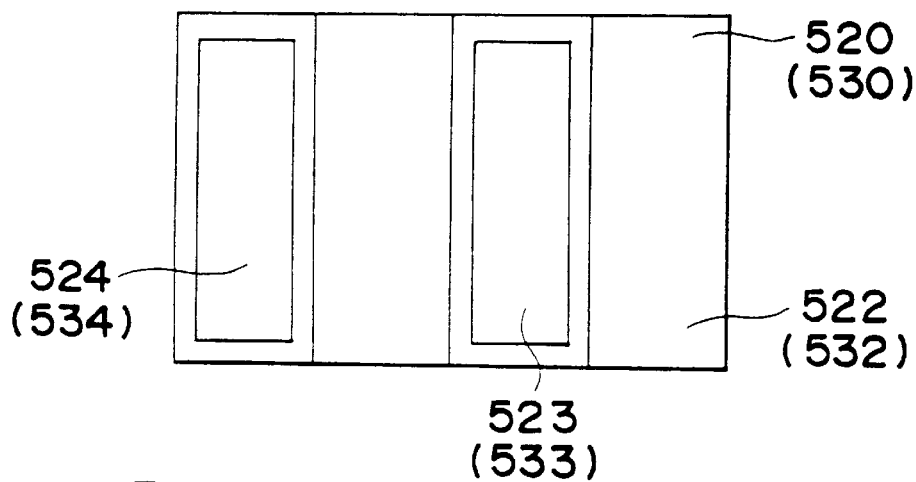
FIG. 36 is a development diagram of four side surfaces of a second (and third) dielectric block 520 (530) in FIG. 31.
Figure 37:
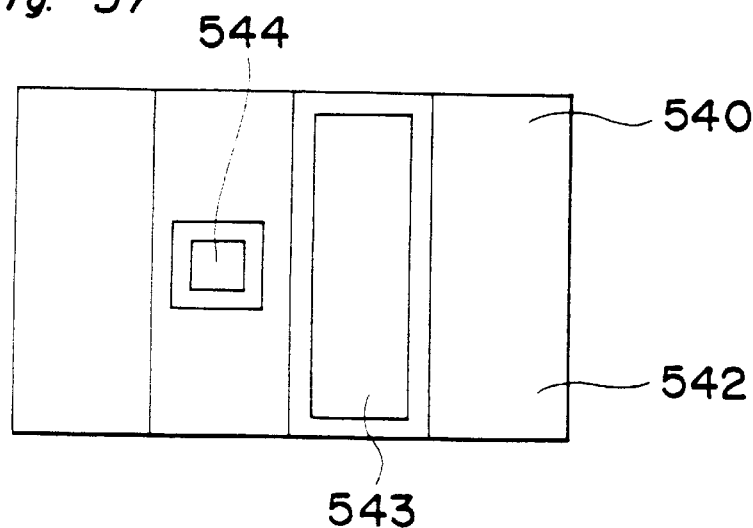
FIG. 37 is a development diagram of four side surfaces of a fourth dielectric block 540 in FIG. 31.

FIG. 32 is a cross sectional view taken along the line M—M of FIG. 31 and FIG. 33 is a cross sectional view taken along the line N—N of FIG. 31. An equivalent circuit diagram of the filter V is shown in FIG. 34. FIGS. 35, 36 and 37 respectively are development diagrams of four side surfaces of the first dielectric block 510, second (third) dielectric block 520 (530) and fourth dielectric block 540.

The first dielectric block 510 is formed of a dielectric material, for example, a ceramic dielectric. The shape of the first dielectric block 510 is a generally rectangular parallelepiped having a top surface, a bottom surface, a front side surface, a rear side surface, a left side surface and a right side surface, where an opening 511 penetrating the central part of the dielectric block 510 opens at the front and rear side surfaces of the block to define a first resonator R5-1.

The first dielectric block 510 is coated with a conductive coating 512 of a thin film by a known electrode film forming method with the use of a conductive material such as silver, copper, etc., where the film is coated over the outer surfaces of the above six surfaces and the inner surface of the opening 511 of the dielectric block except for a part to be described later. The conductive film 512 at the top, bottom, right side and left side surfaces of the first dielectric block 510 is formed so as to be developed as shown in FIG. 35. As is apparent from FIG. 35, there is an exposed rectangular part at the bottom surface of the dielectric block 510 in an area where the electric field displays a superior energy component, which is not coated with the conductive film and therefore the dielectric block is exposed, where an island in the exposed part which is coated with the conductive film is used as a first input coupling electrode 513. Moreover, a rectangular exposed part not coated with the conductive film is further formed at the left side surface of the dielectric block in an area of the predominant energy component of the magnetic field, where a magnetic field coupling window is opened in the exposed part to be used as an inductive coupling window 514.

The first dielectric block 510 with the construction as set forth above has the resonator R5-1 defined by the opening 511. At the same time, an external coupling capacitance Ce is formed between the inner surface of the opening 511 and the bottom surface of the block, while the inductive coupling window 514 opens at the left side surface of the block, as shown in the equivalent circuit diagram of FIG. 34. Therefore, the first input coupling electrode 513 as an input terminal of the filter V is formed at the right side surface and bottom surface of the dielectric body so as to couple an input signal with the resonator R5-1, and the first output coupling window 514 is provided at the left side surface of the dielectric block.

The second dielectric block 520 is formed of a dielectric material such as a ceramic dielectric in the shape of a generally rectangular parallelepiped of approximately the same size as the first dielectric block 510, where an opening 521 of the second dielectric block 520 opens at a front side surface and a rear side surface, passing through the central part of the block, thereby to constitute a second resonator R5-2.

The six outer surfaces, namely the top, the bottom, the front side, the rear side, the left side and the right side surfaces of the dielectric block 520 and the inner surface of the opening 521 are coated with a thin conductive film 522 according to a generally-known electrode film forming method using a conductive material, e.g., silver, copper or the like. The conductive coating 522 at the top, bottom, right side and left side surfaces of the block 520 is so formed as shown in FIG. 36. A rectangular part which is not coated with the conductive film is provided at the right side surface of the dielectric block 520 in an area of the predominant energy component of the magnetic field, and an island in the exposed part is used as a second input coupling window 523 for inductive coupling. At the left side surface of the dielectric block where the magnetic field has a superior energy component is also formed a rectangular exposed part not coated with the conductive film, where the exposed part is used as a second output coupling window 524 for inductive coupling.

As is clear from the equivalent circuit diagram of FIG. 34, the second dielectric block 520 has the resonator R5-2 defined by the opening 521, with the inductive coupling windows formed respectively at the right side and left side surfaces thereof. That is, the second input coupling window 523 is formed at the right side surface of the block to connect an input signal with the resonator R5-2, and the second output coupling window 524 at the left side surface of the block.

The third dielectric block 530 is made of a dielectric material such as a ceramic dielectric, etc. in the shape of a generally rectangular parallelepiped of approximately the same size as the first dielectric block 510, having a top surface, a bottom surface, a front side surface, a rear side surface, a left side surface and a right side surface. The third dielectric block 530 has a structure similar to that of the second dielectric block 520, i.e., having an opening 531 penetrating the central part of the block and which opens at the front and rear side surfaces, thereby to form a third resonator R5-3.

The third dielectric block 530 is coated with a conductive thin film 532 by a well-known film forming method using a conductive material such as silver, copper or the like. Specifically, the film is coated over the six outer surfaces of the dielectric block 530 and the inner surface of the opening 531, except for a part to be depicted later. As shown in FIG. 34, a rectangular exposed part which is not coated with the conductive film is secured at the right side surface of the dielectric block 530 in an area where the energy component of the magnetic field predominates so as to serve as a third input coupling window 533 for inductive coupling. Also, a rectangular part is exposed at the left side surface of the dielectric block also in an area where the energy component of the magnetic field is predominant, which is used as a third output coupling window 534 for inductive coupling.

The third dielectric block 530 of the above-described construction is, as in the equivalent circuit diagram of FIG. 34, provided with the resonator R5-3 defined by the opening 531 and the inductive coupling windows at the right side and left side surfaces thereof, namely, the third input coupling window 533 at the right side surface to couple an input signal with the resonator R5-3 and the third output coupling window 534 at the left side surface.

The fourth dielectric block 540 is formed of a dielectric material such as a ceramic dielectric or the like in the shape of a generally rectangular parallelepiped having approximately the same size as the first dielectric block 510 with top, bottom, front side, rear side, left side and right side surfaces. The fourth dielectric block 540 has an opening 541 which opens at the front and rear side surfaces thereof through the central part, thus constituting a fourth resonator R5-4.

The six outer surfaces and the inner surface of the opening 541 of the fourth dielectric block 540 except for some portions to be described later are coated with a thin conductive film 542 by a known electrode film forming method using silver, copper and the like as a conductive material. The conductive film 542 at the top, bottom, right side and left side surfaces of the fourth dielectric block 540 is formed as shown in FIG. 37. That is, a rectangular part is exposed at the right side surface of the block in an area with a superior energy component of the magnetic field, which is not coated with the conductive film thereby to expose the dielectric block, as shown in FIG. 37, and this exposed part is used as a fourth input coupling window 543 for inductive coupling. At the same time, a rectangular exposed part is provided at the bottom surface of the fourth dielectric block. An island in the exposed part, but coated with the conductive film, is used as a fourth input coupling electrode 544.

In the fourth dielectric block 540 constituted in the above manner, the resonator R5-4 is formed of the opening 541 and the inductive coupling window 543 opens at the right side surface, and an external coupling capacitance Ce is provided between the inner surface of the opening 541 and the bottom surface of the block. The fourth input coupling window 543 formed at the right side surface of the dielectric block is to couple an input signal with the resonator R5-4, and the fourth output coupling electrode 544 at the bottom surface of the dielectric block works as an output terminal of the filter V.

The above four dielectric blocks are aligned laterally so that the left side surface of the first dielectric block 510 confronts the right side surface of the second dielectric block 520 and sequentially, the left side surface of the second dielectric block 520 confronts the right side surface of the third dielectric block 530, and the left side surface of the third dielectric block 530 confronts the right side surface of the fourth dielectric block 540, and said surfaces are bonded to one another by a conductive bonding material. As a result, the filter V of one rectangular parallelepiped unit as shown in FIG. 31 is obtained. In the equivalent circuit diagram of the filter of FIG. 34, four resonators are connected via respective inductive coupling windows, and the external coupling capacitances Ce are present at both ends.

In other words, the part 512 coated with the conductive film at the left side surface of the first dielectric block 510 is bonded to the corresponding part 522 coated with the conductive film at the right side surface of the second dielectric block 520 except for the exposed part by means of a solder or a conductive bonding material 550 such as a conductive adhesive agent containing silver powder. Moreover, the first output coupling window 514 at the exposed part of the left side surface of the first dielectric block 510 faces the second input coupling window 523 formed at the exposed part at the right side surface of the second dielectric block 520, thereby to achieve the inductive coupling of resonators R5-1 and R5-2.

The part 522 coated with the conductive film at the left side surface of the second dielectric block 520 is integrally bonded to the part 532 coated with the conductive film at the right side surface of the third dielectric block 530 adjacent to the second dielectric block 520 via the conductive adhesive material 550 such as a solder or conductive adhesive agent containing silver powder, and the second output coupling window 524 at the left side surface of the second dielectric block 520 is brought to confront the third input coupling window 533 formed at the right side surface of the third dielectric block 530, thereby achieving the inductive coupling of resonators R5-2 and R5-3.

The part 532 coated with the conductive film at the left side surface of the third dielectric block 530 is bonded to the corresponding part 542 coated with the conductive film at the right side surface of the fourth dielectric block 540 except for the exposed part via the conductive adhesive material 550 such as a solder or conductive adhesive agent containing silver powder. Moreover, the third output coupling window 534 formed at the left side surface of the third dielectric block 530 is faced to the fourth input coupling window 543 at the right side surface of the fourth dielectric block 540 to realize the inductive coupling of resonators R5-3 and R5-4.

Sixth Embodiment

A filter according to a sixth embodiment of the present invention will be described with reference to FIGS. 38–44.

Figure 38:
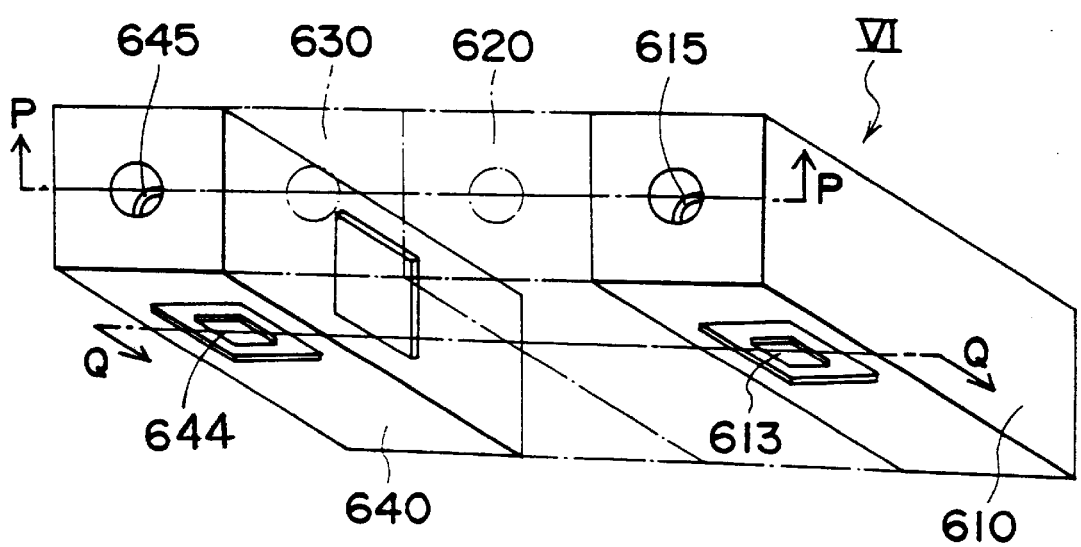
FIG. 38 is a perspective view of a filter VI according to a sixth embodiment of the present invention.
Figure 38:
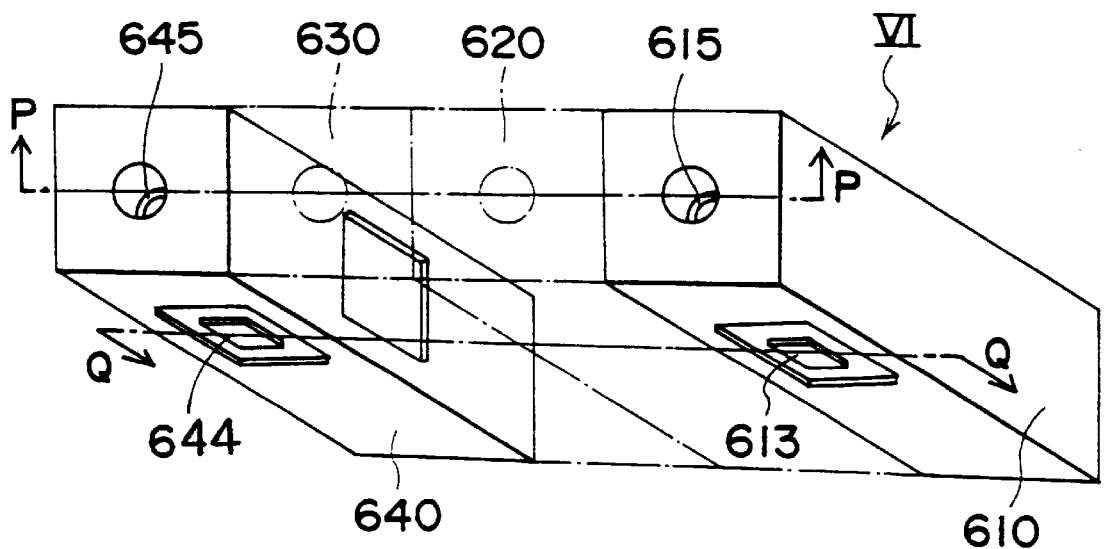

A filter VI shown in FIG. 38 is one unit of four filters including first through fourth dielectric blocks 610, 620, 630 and 640, respectively, exemplifying an inductive coupling resonator which is open-circuited in the vicinity of both ends and having a length $\lambda/2$, where $\lambda$ is the resonant wavelength.

Figure 39:
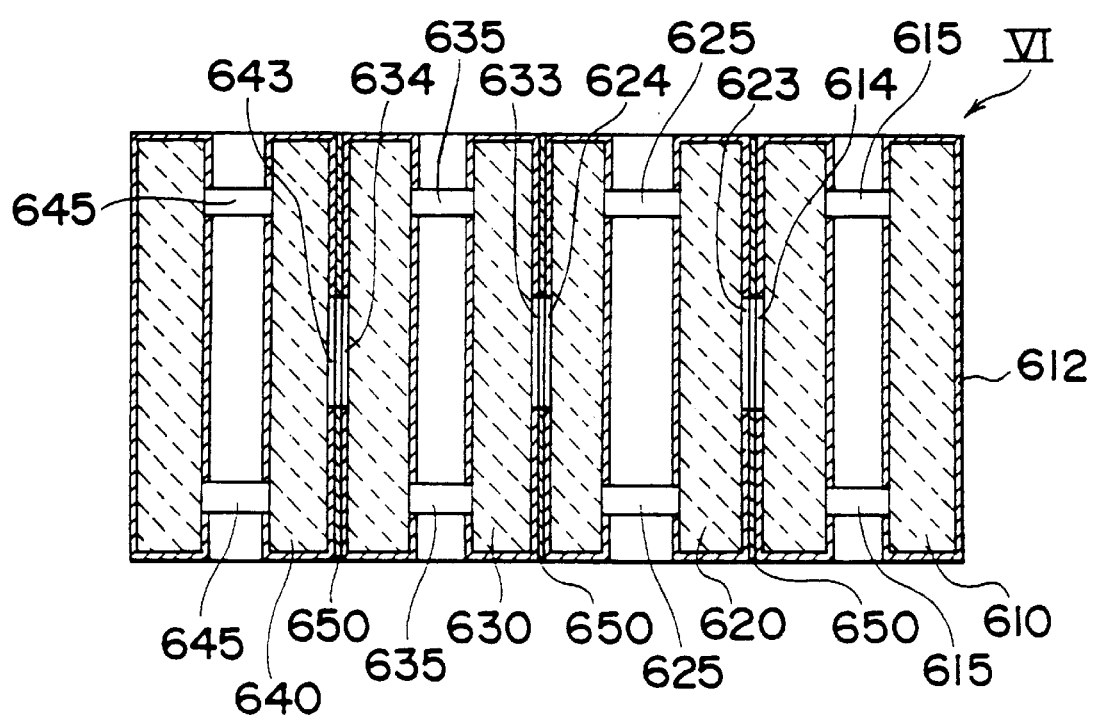
FIG. 39 is a cross sectional view taken along the line P—P of FIG. 38.
Figure 40:
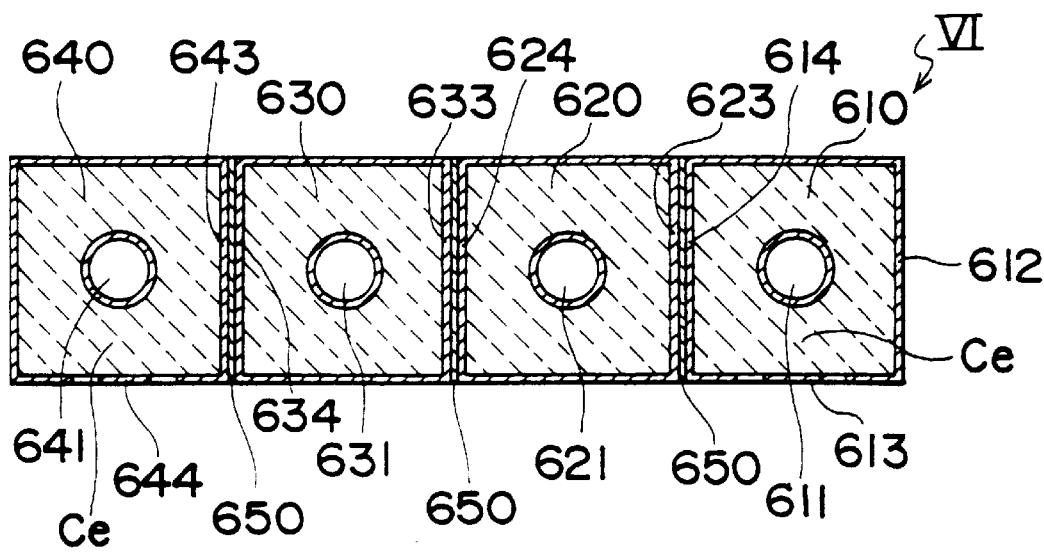
FIG. 40 is a cross sectional view taken along the line Q—Q of FIG. 38.
Figure 41:
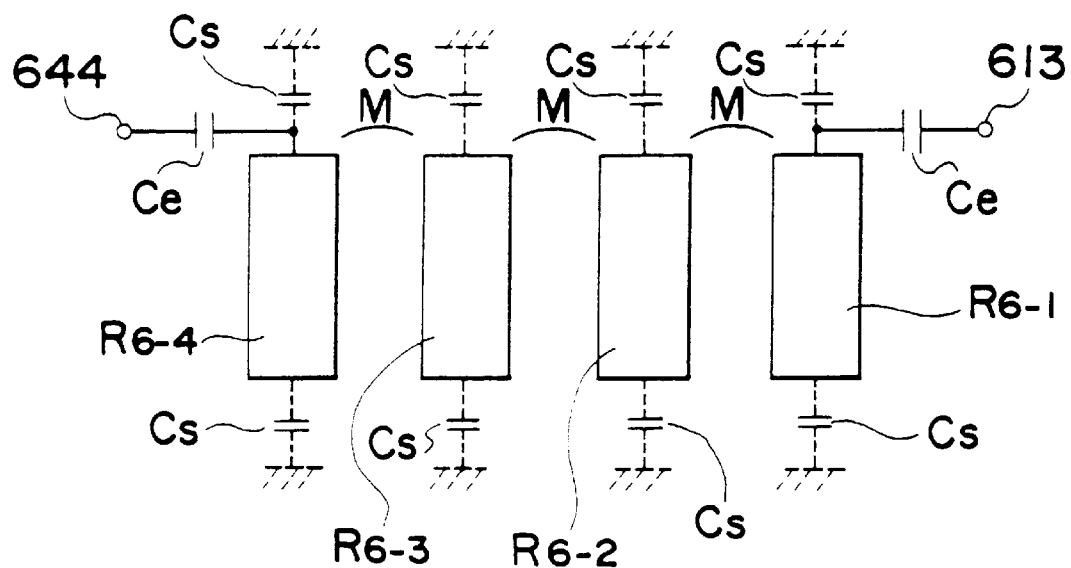
FIG. 41 is an equivalent circuit diagram of the filter VI.
Figure 42:
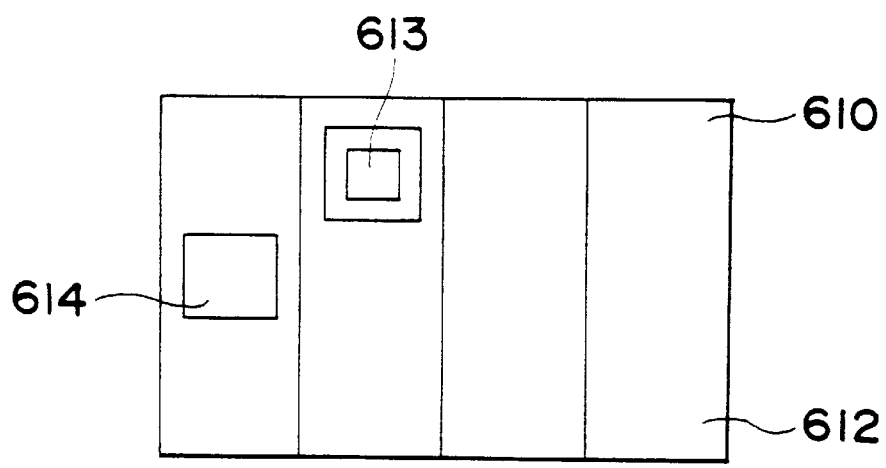
FIG. 42 is a development diagram of four side surfaces of a first dielectric block 610 in FIG. 38.
Figure 43:
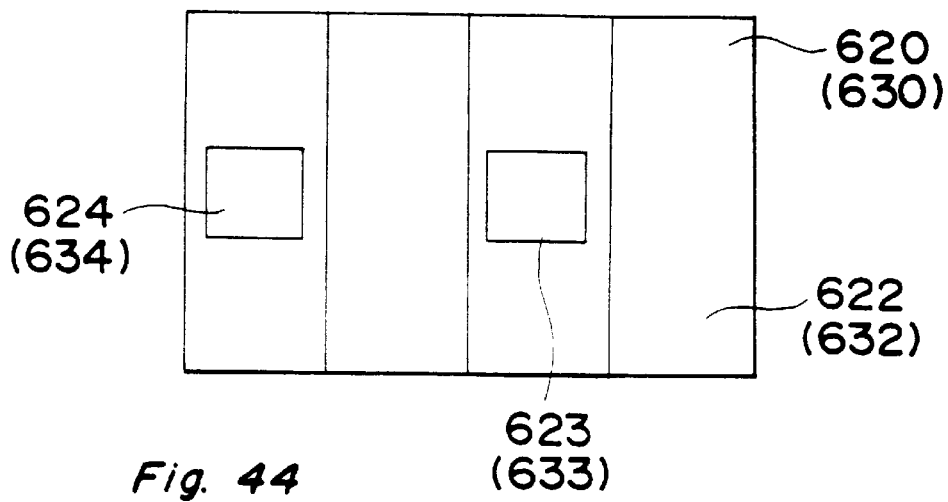
FIG. 43 is a development diagram of four side surfaces of a second (and third) dielectric block 620 (630) in FIG. 38.
Figure 44:
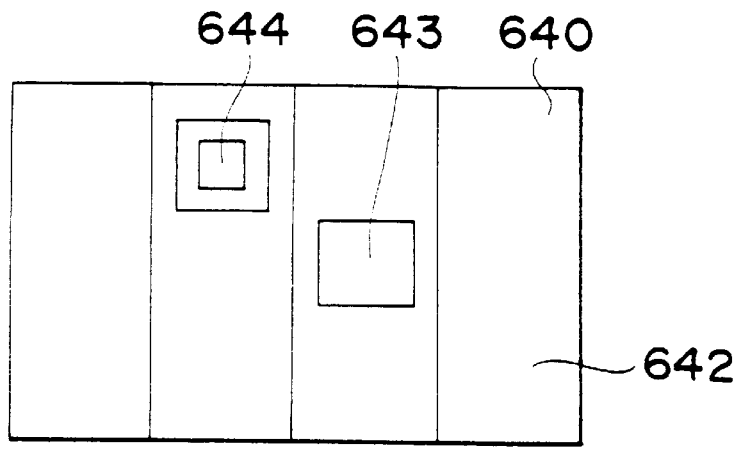
FIG. 44 is a development diagram of four side surfaces of a fourth dielectric block 640 in FIG. 38.

FIG. 39 and FIG. 40 are cross sectional views taken along the lines P—P and Q—Q of FIG. 38, respectively. FIG. 41 is an equivalent circuit diagram of the filter VI, and FIGS. 42, 43 and 44 are development diagrams of the four side surfaces of each of the first, second (third) and fourth dielectric blocks 610, 620 (630) and 640.

The first dielectric block 610 is made of a dielectric material, e.g., a ceramic dielectric or the like, in a generally rectangular parallelepiped shape having a top end surface, a bottom end surface, a front side surface, a rear side surface, a left side surface and a right side surface. The first dielectric block 610 has an opening 611 (FIG. 40) passing through the central part thereof which extends to the front and rear side surfaces of the dielectric block 610, to constitute a first resonator R6-1 (FIG. 41).

Except for the areas described below, the six outer surfaces of the first dielectric block 610 and the inner surface of the opening 611 are coated with a thin film of a conductive coating 612 by a known electrode film forming method with the use of a conductive material such a silver, copper, etc. The conductive coating 612 at the top surface, bottom surface, right side surface and left side surface of the block 610 is formed in a manner illustrated in FIG. 42. Specifically, as shown in FIG. 42, a rectangular exposed area (one which is not coated with the conductive coating film) is provided at the bottom surface of the dielectric block 610 in an area having a predominant energy component of the electric field. A first electrode 613 is formed in the exposed area, to define a first input coupling electrode 613. Additionally, a rectangular exposed area (one which is not coated with the conductive coating film) is formed at the left side surface of the dielectric block 610 in an area with a superior energy component of the magnetic field to define an inductive coupling window 614. Further, as shown in FIG. 39, two ring-shaped exposed areas 615, each having a small width, are provided at the inner surface of the opening 611 near the front side and rear side surfaces of the block.

The first dielectric block 610 has the resonator R6-1 defined by the opening 611, with an external coupling capacity Ce formed between the inner surface of the opening 611 and the bottom surface and, the inductive coupling window 614 at the left side surface thereof, as is clear from the equivalent circuit diagram of FIG. 41. Therefore, the first dielectric block 610 is provided with a first input coupling electrode 613 as the input terminal of the filter VI at the bottom surface of the dielectric block to couple an input signal with the resonator R6-1 and the first output coupling window 614 at the left side surface of the dielectric block. At the same time, stray capacities Cs (FIG. 41) are defined by the exposed areas 615 formed in the inner surface of the opening 611.

The second dielectric block 620 is formed of a dielectric material, for example, a ceramic dielectric, and is approximately the same size as the first dielectric block 610 and has a generally rectangular parallelepiped shape. The block 620 has top end, bottom end, front side, rear side, left side and right side surfaces. An opening 621 penetrating the central part of the second dielectric block 620 extends to the front and rear side surfaces of the block, constituting a second resonator R6-2.

The second dielectric block 620 is covered with a thin conductive film 622 on the six outer surfaces and the inner surface of the opening 621 except for the sections described below. A known electrode film forming method is employed to coat these surfaces using a conductive material such as silver or copper. The conductive film 622 at the top, bottom, right side and left side surfaces of the dielectric block 620 is formed as shown in the development diagram of FIG. 43. As illustrated in FIG. 43, a large exposed rectangular area is formed at the right side surface of the dielectric block in an area where the magnetic field has a strong energy component. The exposed area defines a second input coupling window 623 for the inductive coupling. Similarly, an exposed rectangular area is provided at the left side surface of the dielectric block in an area of the superior energy component of the magnetic field. This defines a second output coupling window 624 for the inductive coupling. Further, as shown in FIG. 39, two ring-shaped exposed areas 625 are formed in the inner surface of the opening 621 near the front and rear side surfaces.

As represented in the equivalent circuit diagram of FIG. 41, the second dielectric block 620 has the resonator R6-2 constituted by the opening 621 and the inductive coupling windows respectively at the right side and left side surfaces thereof. That is, the second input coupling window 623 which receives an input signal to the resonator R6-2 is provided at the right side surface of the dielectric block, while the second output coupling window 624 is formed at the left side surface of the dielectric block. Stray capacities Cs are obtained at two ring-shaped exposed areas 625 in the inner surface of the opening 621.

The third dielectric block 630 formed of a dielectric material, e.g., a ceramic dielectric or the like, is approximately the same size as the first dielectric block 610 and has a generally rectangular parallelepiped configuration with top end, bottom end, front side, rear side, left side and right side surfaces. The third dielectric block 630 has approximately the same structure as the second dielectric block 620, having an opening 631 penetrating the central part of the block which extends to the front and rear side surfaces of the block and thus constitutes a third resonator R6-3.

The outer surfaces of the above six surfaces and the inner surface of the opening 631 of the third dielectric block 630 are covered with a thin conductive film 632 except for portions to be described below. The conductive film is applied according to a known film forming method using a conductive material, e.g., silver or copper. As shown in FIG. 43, an exposed rectangular area is provided at the right side surface of the dielectric block 630 in an area where the energy component of the magnetic field predominates. The exposed area is used as a third input coupling window 633 for the inductive coupling. A similar uncoated rectangular area is provided at the left side surface of the block in an area where the energy component of the magnetic field is strong and is used as a third output coupling window 634. Moreover, as shown in FIG. 39, a pair of small ring-shaped exposed areas 635 are provided in the inner surface of the opening 631 near the front side and rear side surfaces of the block, respectively.

As indicated in the equivalent circuit diagram of FIG. 41, the third dielectric block 630 in the above-described structure has the resonator R6-3 constituted of the opening 631 and inductive coupling windows respectively at the right side and left side surfaces thereof. In other words, the third dielectric block 630 has the third input coupling window 633 at its right side surface to connect an input signal with the resonator R6-3, and the third output coupling window 634 at its left side surface, with stray capacities Cs formed at the exposed areas 635 in the inner surface of the opening 631.

The fourth dielectric block 640 is formed of a ceramic dielectric or a like dielectric material in the shape of a generally rectangular parallelepiped which has approximately the same size as that of the first dielectric block 610. The fourth dielectric block 640 has a top end surface, a bottom end surface, a front side surface, a rear side surface, a left side surface and a right side surface. An opening 641 penetrating the central part of the fourth dielectric block 640 extends to the front and rear side surfaces of the block thereby to define a fourth resonator R6-4.

The fourth dielectric block 640 is coated with a thin conductive film 642 by a common electrode film forming method with the use of silver or copper, that is, a conductive material. Specifically, the outer surfaces of the six surfaces and the inner surface of the opening 641 except for the areas discussed below are coated with the conductive film. The film 642 at the top end, bottom end, right side and left side surfaces of the fourth dielectric block 640 is formed as shown in the development diagram of FIG. 44. As is clear in FIG. 44, an exposed rectangular area is formed at the right side surface of the dielectric block 640 in an area where the magnetic field shows superior energy component. The exposed area defines a fourth input coupling window 643 for the inductive coupling. A further exposed rectangular area is provided at the bottom surface of the dielectric block where the electric field has a predominating energy component. An island shaped electrode is formed in this exposed area to define a fourth output coupling electrode 644. A pair of small ring-shaped exposed areas 645 are formed near the front and rear side surfaces, respectively, in the inner surface of the opening 641, as illustrated in FIG. 39.

The fourth dielectric block 640 in the above constitution has, as represented in the equivalent circuit diagram of FIG. 41, the resonator R6-4 defined by the opening 641, the inductive coupling window 643 at the right side surface thereof and an external coupling capacity Ce between the inner surface of the opening 641 and the bottom end surface. The fourth input coupling window 643 is formed at the right side surface of the fourth dielectric block, and the fourth output coupling electrode 644 to be an output terminal of the filter VI is formed at the bottom surface of the dielectric block. Moreover, two stray capacities Cs are formed at the ring-shaped exposed areas 645 in the inner surface of the opening 641.

The four dielectric blocks constituted in the above-described manner are aligned side by side such that the left side surface of the first dielectric block 610 faces the right side surface of the second dielectric block 620, the left side surface of the second dielectric block 620 faces the right side surface of the third dielectric block 630, and the left side surface of the third dielectric block 630 faces the right side surface of the fourth dielectric block 640. When the aligned blocks are integrally bonded via a conductive adhesive material, the filter VI having a rectangular parallelepiped shape as shown in FIG. 38 is obtained. In the equivalent circuit diagram of the filter, the four resonators are connected via respective inductive coupling windows, having external coupling capacities Ce at both ends, as shown in FIG. 41. The stray capacity Cs of FIG. 41 is so small as to be negligible.

Particularly, the conductive film 612 at the left side surface of the first dielectric block 610 is bonded to the conductive film 622 at the right side surface of the adjacent second dielectric block 620, except for the exposed area, by a solder or a conductive bonding material 650 containing silver powder. At the same time, the first output coupling window 614 which is not coated with the conductive film and which is formed at the left side surface of the dielectric block 610 is opposed to the second input coupling window 623 at the exposed area of the right side surface of the second dielectric block 620, so that the inductive coupling is achieved between the resonators R6-1 and R6-2.

The conductive film 622 at the left side surface of the second dielectric block 620 is integrally bonded to the conductive film 632 at the right side surface of the third dielectric block 630 through the conductive adhesive material 650 such as a solder or conductive adhesive agent containing silver powder. At the same time, the second output coupling window 624 formed at the left side surface of the second dielectric block 620 opposes the third input coupling window 633 at the right side surface of the third dielectric block 630, thereby realizing the inductive coupling of the resonators R6-2 and R6-3.

Meanwhile, the conductive film 632 at the left side surface of the third dielectric block 630 is integrally bonded with the conductive film 642 at the right side surface of the fourth dielectric block 640 except for the exposed area by the conductive adhesive material 650. The third output coupling window 634 at the left side surface of the third dielectric block 630 faces the corresponding fourth input coupling window 643 at the right side surface of the fourth dielectric block 640, to achieve the inductive coupling of the resonators R6-3 and R6-4.

Although the filter in each of the foregoing embodiments includes four dielectric blocks in a single unit, the present invention encompasses units having a greater or lesser number of dielectric blocks. For example, a unit may be formed by coupling only the first and fourth dielectric blocks, or the second (and/or the third) dielectric block may be included to provide an inter-stage resonator between the first and fourth dielectric blocks. It is also possible to provide three or more inter-stage resonators.

In the case where the filter is to be formed of the first and fourth dielectric blocks of the first embodiment as shown in FIG. 8, the filter should be composed of the following parts:

1) A first dielectric block 110 having a rectangular parallelepiped shape, having a first surface, a second surface and at least first, second and third side surfaces, with a first resonator R1-1 extending between the first and second surfaces;

2) A first input coupling 113 as an input terminal of the filter positioned at least at one of the first side and second side surfaces of the first dielectric block 110, and coupled electrostatically to the first resonator R1-1;

3) A first output coupling 114 disposed at least at the third side surface of the first dielectric block 110 and electrostatically coupled to the first resonator R1-1;

4) A first coating 112 of a conductive material substantially covering at least the first, second, first side, second side and third side surfaces of the first dielectric block 110, except for the part where the first input coupling 113 and the first output coupling 114 are provided;

5) A through-hole 111 having both ends opened at the first and second surfaces of the first dielectric block 110, with the side surface thereof partly covered with the conductive material in the lengthwise direction. One end of the conductive body is connected to the first coating 112 and the other end thereof is electrically insulated from the first coating 112;

6) A second dielectric block 140 having a rectangular parallelepiped shape, having first, second and at least first side, second side and third side surfaces, with a second resonator R1-4 extending between the first and second surfaces;

7) A second input coupling 143 disposed at least at the third side surface of the second dielectric block 140 and electrostatically coupled to the second resonator R1-4;

8) A second input coupling 144 as an output terminal of the filter provided at least at one of the first and second side surfaces of the second dielectric block 140 and electrostatically coupled to the second resonator R1-4;

9) A second coating 142 of a conductive material substantially covering at least the first, second, first side, second side and third side surfaces of the second dielectric block 140, except for the part where the second input coupling and the second output coupling are provided;

10) A through-hole 141 having both ends opened at the first and second surfaces of the second dielectric block 140, with the side surface thereof being partly covered with the conductive material in the lengthwise direction. One end of the conductive body is connected to the second coating 142, and the other end thereof is electrically insulated from the second coating 142;

11) The first output coupling 114 and the second input coupling 143 include the conductive substance formed at the third side surface of the first dielectric block 110 and at the third side surface of the second dielectric block 140, while being electrically insulated from the first coating 112 of the conductive material formed at the third side surface of the first dielectric block 110 and the second coating 142 of the conductive material formed at the third side surface of the second dielectric block 140, respectively;

12) An electrical connection (not shown) between the first output coupling 114 and the second input coupling 143; and 13) Fixing (not shown) the first dielectric block 110 and the second dielectric block 140 together.

Figure 48:
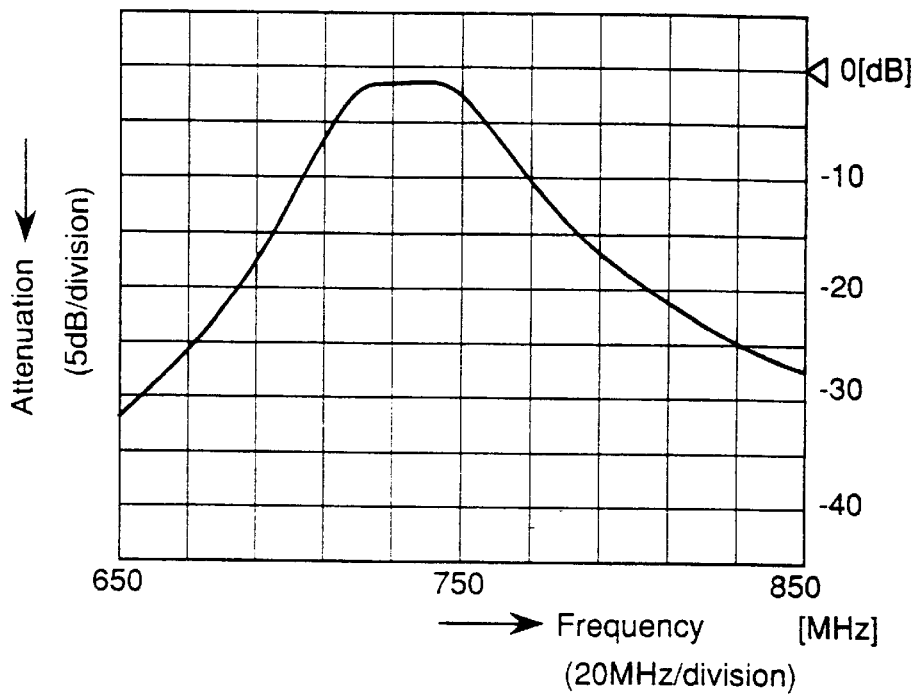
FIG. 48 is a characteristic diagram of the dielectric filter of FIG. 8 consisting of two dielectric blocks with coupling electrodes of one size.
Figure 49:
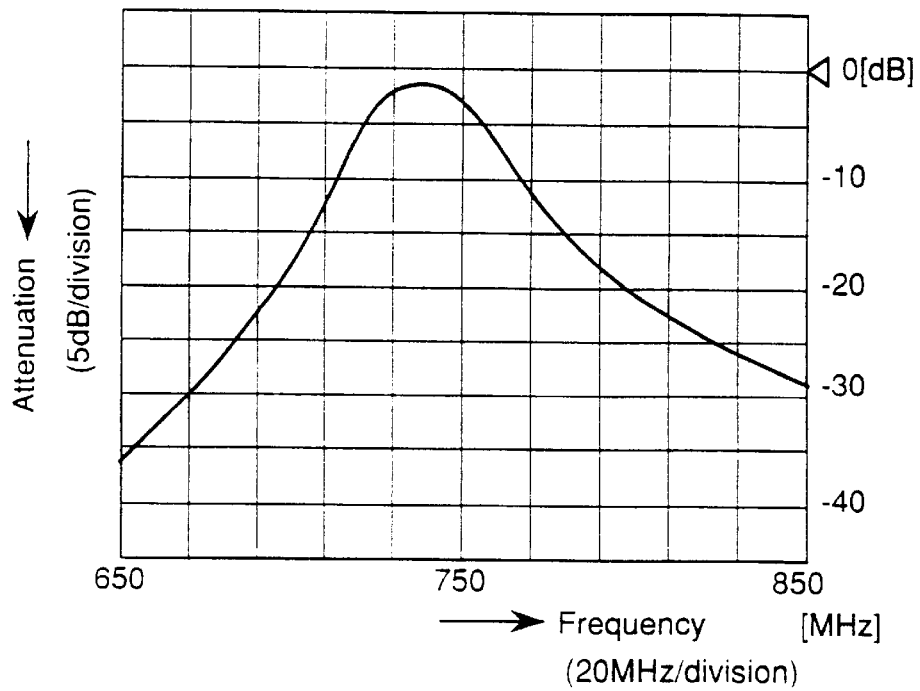
FIG. 49 is a characteristic diagram of the dielectric filter of FIG. 8 consisting of two dielectric blocks with coupling electrodes of the other size.
Figure 50:
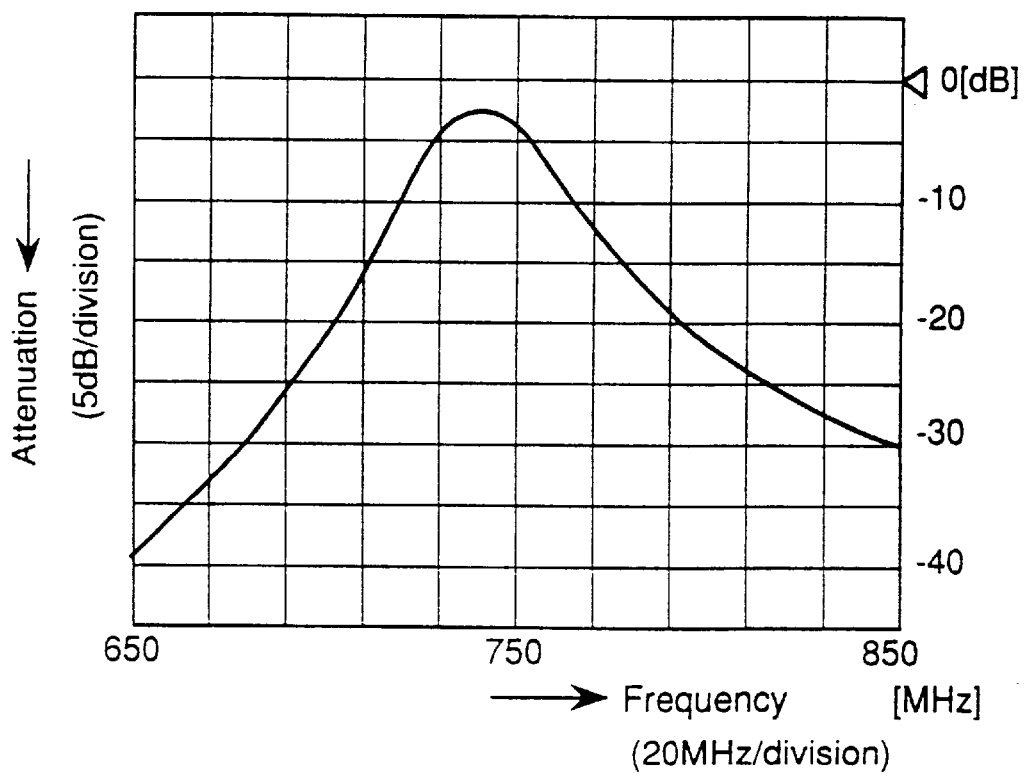
FIG. 50 is a characteristic diagram of the dielectric filter of FIG. 8 consisting of two dielectric blocks with coupling electrodes of the other different size.

Three kinds of filters each consisting of two dielectric blocks in the structure described above have been prepared and their filtering characteristics have been measured. More specifically, each dielectric block is 12.0 mm long, 3.0 mm high and 2.6 mm wide, and each coupling electrode (first output coupling 114 and second input coupling 143) provided at the side surface of the block is 1.4 mm high with an area (1) 1.4×2.2 mm$^2$, (2) 1.4×1.6 mm$^2$, and (3) 1.4×1.3 mm$^2$. The results are shown in the graphs in FIGS. 48, 49 and 50, respectively. As is clear from the graphs of the measured data, it is understood that the frequency bandwidth is increased as the area of the electrode is increased, thus realizing a higher degree of coupling.

If the filter is to be constituted of three or more dielectric blocks, i.e., first, second (or third) and fourth or more dielectric blocks in the first embodiment, the filter should be composed of the following parts, as shown in FIG. 9:

1) A first dielectric block 110 having a rectangular parallelepiped shape, having first, second and at least first, second and third side surfaces, with a first resonator R1-1 extending between the first and second surfaces;

2) A first input coupling 113 as an input terminal of the filter positioned at least at one of the first side and second side surfaces of the first dielectric block 110 and electrostatically coupled to the first resonator R1-1;

3) A first output coupling 114 arranged at least at the third side surface of the first dielectric block 110 and electrostatically coupled to the first resonator R1-1;

4) A first coating 112 of a conductive material substantially covering at least the first, second, first side, second side and third side surfaces of the first dielectric block, except for the part where the first input coupling 113 and the first output coupling 114 are provided;

5) A through-hole 111 having both ends opened at the first and second surfaces of the first dielectric block 110, with the side surface thereof partly covered with the conductive material in the lengthwise direction. The conductive material has one end connected to the first coating means 112 and the other end electrically insulated from the first coating means 112;

6) A second (or third) dielectric block 120 (or 130) as an inter-stage resonator in the rectangular parallelepiped, having first, second and at least first side and second side surfaces, with a second (or third) resonator R1-2 (or R1-3) extending between the first and second surfaces;

7) A second (or third) input coupling 123 (or 133) positioned at least at the first side surface of the second (or third) dielectric block 120 (or 130) and electrostatically coupled to the second (or third) resonator R1-2 (R1-3);

8) A second (or third) output coupling 124 (or 134) disposed at least at the second side surface of the second (or third) dielectric block 120 (or 130) and electrostatically coupled to the second (or third) resonator R1-2 (or R1-3);

9) A second (or third) coating 122 (or 132) of a conductive material substantially covering at least the first, second, first side and second side surfaces of the second (or third) dielectric block 120 (or 130), except for the part where the second (or third) input coupling 123 (or 133) and the second (or third) output coupling 124 (or 134) are provided;

10) A through-hole 121 (or 131) having both ends opened at the first and second surfaces of the second (or third) dielectric block 120 (or 130), with the side surface thereof partly covered with a conductive material in the lengthwise direction. One end of the conductive material is connected to the second (or third) coating 122 or (132) and the other end thereof is electrically insulated from the second (or third) coating 122 (or 132);

11) a fourth dielectric block 140 having a shape of a rectangular parallelepiped, having first, second and at least first side, second side and third side surfaces, with an inter-stage resonator R1-4 extending between the first and second surfaces;

12) An input coupling 143 for coupling the resonator R1-4 with the resonator R1-2 (or R1-3) in the preceding stage, positioned at the third side surface of the dielectric block 140 for the resonator and electrostatically coupled to the resonator R1-4;

13) An output coupling 144 as an output terminal of the filter, disposed at one of the first side and second side surfaces of the dielectric block 140 for the resonator and electrostatically coupled to the resonator R1-4;

14) A third coating 142 of a conductive material substantially covering at least the first, second, first side, second side and third side surfaces of the dielectric block 140 for the resonator, except for the part where the input coupling 143 and the output coupling 144 are provided;

15) A through-hole 141 having both ends opened at the first and second surfaces of the dielectric block 140 for the resonator, with the side surface thereof partly covered with a conductive material in the lengthwise direction. The conductive material has one end connected to the third coating 143, and the other end electrically insulated from the third coating 142;

16) The first output coupling 114 includes the conductive substance formed at the third side surface of the first dielectric block 110, while being electrically insulated from the first coating 112 of the conductive material at the third side surface of the first dielectric block 110. Moreover, the input coupling 123 (or 133) of the inter-stage resonator R1-2 (or R1-3) which is to be coupled to the first resonator R1-1 among at least one inter-stage resonator includes the conductive substance formed at the first side surface of the dielectric block 120 (or 130) for the inter-stage resonator, and is electrically insulated from the second (or third) coating 122 (or 132) of the conductive material formed at the first side surface of the dielectric block 120 (or 130) for the inter-stage resonator;

17) The fourth input coupling 143 includes the conductive substance formed at the third side surface of the fourth dielectric block 140 and is electrically insulated from the fourth coating 142 of the conductive material at the third side surface of the fourth dielectric block 140. The output coupling 124 (or 134) of the inter-stage resonator R1-2 (or R1-3) which is to be coupled to the fourth resonator among at least one inter-stage resonator includes the conductive substance formed at the second side surface of the dielectric block 120 (or 130) for the inter-stage resonator, and electrically insulated from the second (or third) coating 122 (or 132) of the conductive material formed at the second side surface of the dielectric block 120 (or 130) for the inter-stage resonator;

18) An electrical connection (not shown) between the first output coupling 114 and the input coupling 123 (or 133) of the inter-stage resonator R1-2 (or R1-3) which is to be coupled to the first resonator R1-1 among at least one inter-stage resonator;

19) An electrical connection (not shown) between the fourth input coupling 143 and the output coupling 124 (or 134) of the inter-stage resonator R1-2 (or R1-3) which is to be coupled to the fourth resonator R1-4 among at least one inter-stage resonator;

20) Fixing (not shown) the first dielectric block 110 and the dielectric block 120 (or 130) for the inter-stage resonator; and 21) Fixing (not shown) the fourth dielectric block 140 and the dielectric block 120 (or 130) for the inter-stage resonator.

In any of the foregoing second-sixth embodiments, it is possible to constitute a filter of two stages, three stages and five or more stages by combining suitably the inter-stage resonator dielectric blocks.

Figure 45:
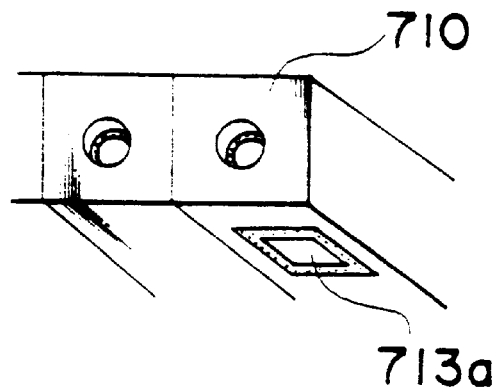
FIG. 45 is a perspective view of an electrode disposed only at the bottom surface of a polyhedral dielectric block 710.
Figure 46:
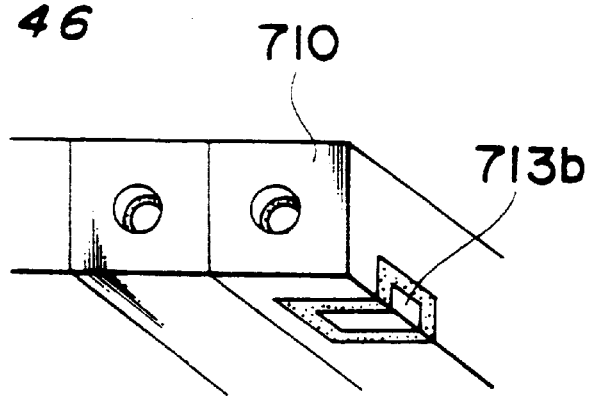
FIG. 46 is a perspective view of a modification of FIG. 45.

Regarding the input/output electrode to mount the filter to a circuit board, although it is possible to use an electrode 713a as shown in FIG. 45, which is provided only at the bottom surface of a polyhedral dielectric block 710, it is also possible to form an electrode 713b bridging the bottom surface and the side surface of the polyhedral dielectric block 710 as illustrated in FIG. 46. In FIG. 45, the contact with outside circuitry is obtained only at the electrode 713a at the bottom surface of the dielectric block 710. On the other hand, in FIG. 46, it is realized at the electrode 713 bridging the bottom surface and the side surface of the dielectric block 710.

Figure 47:
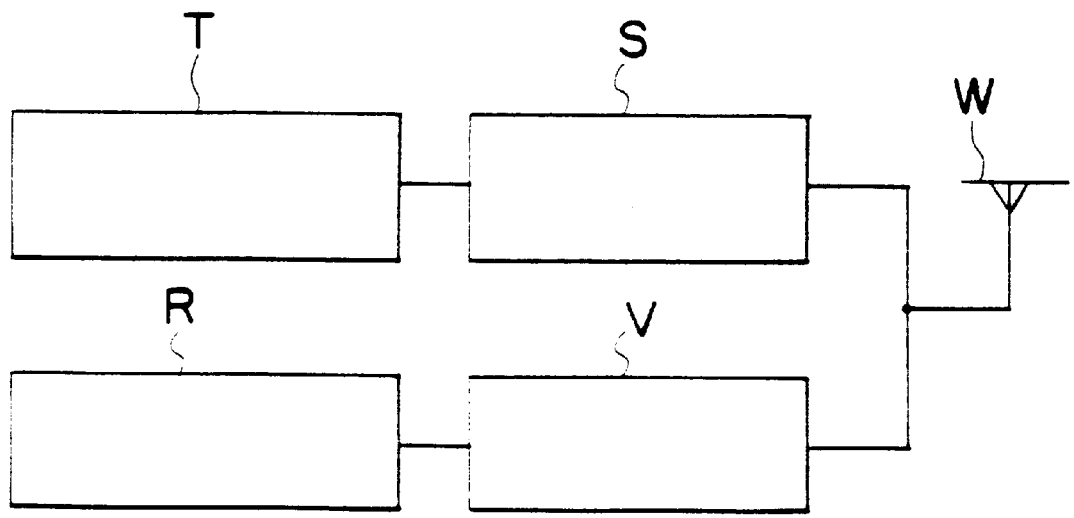
FIG. 47 is a circuit diagram of a transceiver according to the present invention.

The filter embodied in each of the foregoing examples can be used broadly, not only as an inter-stage filter installed between amplifiers, but also as a transmission filter and/or a receiving filter, for instance, a transmission filter interposed between a transmission circuit and an antenna of a transceiver (including a radio telephone, an automobile telephone, an aeronautical telephone, a ship service telephone or a portable telephone), or a receiver filter between a receiver circuit and the antenna of the transceiver, as indicated in FIG. 47. If the filter of the present invention is employed as the transmission filter S between the transmission circuit T and antenna W or the receiver filter V between the receiver circuit R and antenna W, the transceiver is made more compact in size.

Although embodiments of the invention are described, the invention is not limited to those embodiments but extends broadly to modifications, variations and alternatives within the fair spirit and scope of the disclosed concepts.

What is claimed is:

1. A transceiver comprising:

a transmission circuit;

a receiver circuit; and an antenna terminal;

a pair of filters, wherein one of said filters is connected in a series circuit between said transmission circuit and said antenna terminal, and the other of said filters is connected in a series circuit between said receiver circuit and said antenna terminal;

at least one of said filters being a dielectric filter, said dielectric filter having:

a first dielectric block having a through bore extending between first and second end faces thereof, said first dielectric block having a plurality of side surfaces extending between said end faces, substantially all of said first and second end faces, said side surfaces and said bore being covered with a conductive film to define a first dielectric resonator whose magnetic energy when an input signal is applied thereto varies in the direction of an axis of said through bore, a pair of ring shaped areas wherein said conductive film does not exist at said first through bore defining respective capacitances across corresponding said ring shaped areas, each of said ring shaped areas being near a respective end of said bore;

a first coupling window in said conductive film on a first one of said side surfaces of said first dielectric block for coupling said input signal applied thereto to said first dielectric resonator;

a second coupling window on a second one of said side surfaces of said first dielectric block in a location wherein said magnetic energy in said dielectric block is at a relatively higher level than in other locations in said dielectric block so that magnetic energy in said first dielectric block exits said first dielectric block via said second coupling window;

a second dielectric block having a through bore extending between first and second end faces thereof, said second dielectric block having a plurality of side surfaces extending between said first and second end faces of said second dielectric block, substantially all of said first and second end faces, said side surfaces and said bore of said second dielectric block being covered with a conductive film to define a second dielectric resonator, a first side surface of said second dielectric block abutting said second side surface of said first dielectric block, a pair of ring shaped areas in said second dielectric block wherein said conductive film does not exist at said second through bore defining respective capacitances across corresponding said ring shaped areas, each of said ring shaped areas being near a respective end of said bore of said second dielectric block;

a third coupling window on said first side surface of said second dielectric block at a location corresponding to said second coupling window such that magnetic energy leaving said first dielectric block via said second coupling window enters said second dielectric block via said third coupling window and sets up a magnetic field in said second dielectric block whose magnetic energy varies in the direction along said through bore of said second dielectric block; and a fourth coupling window on a second one of said side surfaces of said second dielectric block, wherein said first and fourth coupling windows provide an input and output of said filter for connection in said series circuit.

2. A transceiver as recited in claim 1, further comprising an antenna connected to said antenna terminal.

3. A dielectric filter, comprising:

(1) a first dielectric block having a through bore extending between first and second end faces thereof, said first dielectric block having a plurality of side surfaces extending between said end faces, substantially all of said first and second end faces, said side surfaces and said bore being covered with a conductive film to define a first dielectric resonator whose magnetic energy when an input signal is applied thereto varies in the direction of an axis of said through bore, a pair of ring shaped areas wherein said conductive film does not exist at said first through bore defining respective capacitances across corresponding said ring shaped areas, each of said ring shaped areas being near a respective end of said bore;

a first coupling window in said conductive film on a first one of said side surfaces of said first dielectric block for coupling said input signal applied thereto to said first dielectric resonator;

a second coupling window on a second one of said side surfaces of said first dielectric block in a location wherein said magnetic energy in said dielectric block is at a relatively higher level than in other locations in said dielectric block so that magnetic energy in said first dielectric block exits said first dielectric block via said second coupling window;

(2) a second dielectric block having a through bore extending between first and second end faces thereof, said second dielectric block having a plurality of side surfaces extending between said first and second end faces of said second dielectric block, substantially all of said first and second end faces, said side surfaces and said bore of said second dielectric block being covered with a conductive film to define a second dielectric resonator, a first side surface of said second dielectric block abutting said second side surface of said first dielectric block, a pair of ring shaped areas in said second dielectric block wherein said conductive film does not exist at said second through bore defining respective capacitances across corresponding said ring shaped areas, each of said ring shaped areas being near a respective end of said bore of said second dielectric block;

a third coupling window on said first side surface of said second dielectric block at a location corresponding to said second coupling window such that magnetic energy leaving said first dielectric block via said second coupling window enters said second dielectric block via said third coupling window and sets up a magnetic field in said second dielectric block whose magnetic energy varies in the direction along said through bore of said second dielectric block; and a fourth coupling window on a second one of said side surfaces of said second dielectric block;

(3) a third dielectric block having a through bore extending between first and second end faces thereof, said third dielectric block having a plurality of side surfaces extending between said first and second end faces of said third dielectric block, substantially all of said first and second end faces, said side surfaces and said bore of said third dielectric block being covered with a conductive film to define a third dielectric resonator, a first side surface of said third dielectric block abutting said second side surface of said second dielectric block, a pair of ring shaped areas in said third dielectric block wherein said conductive film does not exist at said bore of said third dielectric block defining respective capacitances across corresponding said ring shaped areas, each of said ring shaped areas being near a respective end of said bore of said third dielectric block;

a fifth coupling window on said first side surface of said third dielectric block at a location corresponding to said fourth coupling window such that magnetic energy leaving said second dielectric block via said fourth coupling window enters said third dielectric block via said fifth coupling window and sets up a magnetic field in said third dielectric block whose magnetic energy varies in the direction along said through bore of said third dielectric block; and a sixth coupling window on a second one of said side surfaces of said third dielectric block;

(4) a fourth dielectric block having a through bore extending between first and second end faces thereof, said fourth dielectric block having a plurality of side surfaces extending between said first and second end faces of said fourth dielectric block, substantially all of said first and second end faces, said side surfaces and said bore of said fourth dielectric block being covered with a conductive film to define a fourth dielectric resonator, a first side surface of said fourth dielectric block abutting said second side surface of said third dielectric block, a pair of ring shaped areas in said fourth dielectric block in which said conductive film does not exist at said through bore of said fourth dielectric block defining respective capacitances across corresponding said ring shaped areas, each of said ring shaped areas being near a respective end of said bore of said fourth dielectric block;

a seventh coupling window on said first side surface of said fourth dielectric block at a location corresponding to said sixth coupling window such that magnetic energy leaving said third dielectric block via said sixth coupling window enters said fourth dielectric block via said seventh coupling window and sets up a magnetic field in said fourth dielectric block whose magnetic energy varies in the direction along said through bore of said fourth dielectric block; and an eighth coupling window on a second one of said side surfaces of said fourth dielectric block;

wherein said second coupling window, said fourth coupling window, and said sixth coupling window are each located at approximately an area of a maximum energy level of the corresponding dielectric block.

* * * * *